United States Patent
Becker et al.

(10) Patent No.: US 7,406,269 B2
(45) Date of Patent: Jul. 29, 2008

(54) FEEDBACK-CONTROLLED COHERENT OPTICAL RECEIVER WITH ELECTRICAL COMPENSATION/EQUALIZATION

(75) Inventors: Donald A. Becker, Edison, NJ (US); Daniel R. Mohr, Allentown, NJ (US); Christoph T. Wree, Ewing, NJ (US); Abhay M. Joshi, New Hope, PA (US)

(73) Assignee: Discovery Semiconductors, Inc., Ewing, NJ (US)

( * ) Notice: Subject to any disclaimer, the term of this patent is extended or adjusted under 35 U.S.C. 154(b) by 19 days.

(21) Appl. No.: 11/711,572

(22) Filed: Feb. 27, 2007

(65) Prior Publication Data
US 2008/0038001 A1    Feb. 14, 2008

Related U.S. Application Data

(60) Provisional application No. 60/781,233, filed on Mar. 10, 2006.

(51) Int. Cl.
*H04B 10/00* (2006.01)
(52) U.S. Cl. .................... 398/206; 398/203; 398/205; 398/207; 398/213
(58) Field of Classification Search .......... 398/202–214
See application file for complete search history.

(56) References Cited

U.S. PATENT DOCUMENTS

| | | | | |
|---|---|---|---|---|
| 4,596,052 A | | 6/1986 | Wright et al. ............... 398/204 |
| 4,718,121 A | * | 1/1988 | Epworth .................... 398/203 |
| 4,723,315 A | * | 2/1988 | Wetherell ................... 398/203 |
| 4,732,447 A | * | 3/1988 | Wright et al. ................. 385/46 |
| 4,817,206 A | * | 3/1989 | Calvani et al. ............... 398/152 |
| 4,888,817 A | * | 12/1989 | Ryu et al. ................... 398/205 |
| 4,965,858 A | | 10/1990 | Naito et al. ................. 398/205 |
| 5,003,626 A | * | 3/1991 | Kuwahara et al. ........... 398/204 |
| 5,007,106 A | * | 4/1991 | Kahn et al. ................. 398/203 |
| 5,052,051 A | | 9/1991 | Naito et al. ................. 398/204 |
| 5,115,332 A | | 5/1992 | Naito et al. ................. 398/202 |
| 5,142,402 A | * | 8/1992 | Tsushima et al. ........... 398/205 |
| 5,208,652 A | * | 5/1993 | Sonobe et al. ............. 356/460 |
| 5,247,382 A | * | 9/1993 | Suzuki ...................... 398/201 |
| 5,319,438 A | * | 6/1994 | Kiasaleh .................... 398/203 |
| 5,367,397 A | * | 11/1994 | Tajima ...................... 398/137 |
| 5,400,167 A | * | 3/1995 | Suemura .................... 398/209 |
| 5,422,752 A | * | 6/1995 | Hardcastle ................. 398/187 |
| 5,457,561 A | * | 10/1995 | Taneya et al. .............. 398/120 |
| 5,459,599 A | * | 10/1995 | Van Deventer ............. 398/136 |

(Continued)

OTHER PUBLICATIONS

Ian Garrett, Gunnar Jacobsen; "Theoretical Analysis of Heterodyne Optical Receivers for Transmission Systems Using Semiconductor) Lasers with Nonnegligible Linewidth"; Journal of Lightwave Technology, vol. LT-4, Issue 3, Mar. 1986; pp. 323-334.

(Continued)

*Primary Examiner*—Agustin Bello
(74) *Attorney, Agent, or Firm*—Watov & Kipnes, P.C.; Kenneth Watov

(57) ABSTRACT

An optical coherent receiver in one embodiment has a heterodyne configuration, and in another embodiment has a homodyne configuration, in each configuration employs multiple feedback signaling and analog/digital processing to optimize response to a modulated optical input signal, the provision of both individual RF I and RF Q channel outputs.

29 Claims, 8 Drawing Sheets

U.S. PATENT DOCUMENTS

| | | | | |
|---|---|---|---|---|
| 5,463,461 A | | 10/1995 | Horiuchi et al. | 356/484 |
| 5,546,190 A | * | 8/1996 | Hill et al. | 398/76 |
| 5,600,474 A | * | 2/1997 | Tomesen et al. | 398/205 |
| 5,991,062 A | * | 11/1999 | Fischer et al. | 398/204 |
| 6,782,212 B2 | * | 8/2004 | Tsao et al. | 398/205 |
| 6,798,994 B1 | * | 9/2004 | Tsao et al. | 398/204 |
| 6,999,688 B1 | * | 2/2006 | Hui et al. | 398/205 |
| 7,042,629 B2 | * | 5/2006 | Doerr et al. | 359/325 |
| 7,076,169 B2 | * | 7/2006 | Shpantzer et al. | 398/76 |
| 7,085,501 B1 | * | 8/2006 | Rickard et al. | 398/202 |
| 2002/0167708 A1 | * | 11/2002 | Tsao et al. | 359/191 |
| 2007/0071456 A1 | * | 3/2007 | Chen et al. | 398/204 |

OTHER PUBLICATIONS

Richard A. Linke, Alan. H. Gnauck; "High-Capacity Coherent Lightwave Systems"; Journal of Lightwave Technology, vol. 6, Issue 11, Nov. 1988; pp. 1750-1769.

Katsushi Iwashita, Noboru Takachio; "Chromatic Dispersion Compensation in Coherent Optical Communications"; Journal of Lightwave Technology, vol. 8, Issue 3, Mar. 1990; pp. 367-375.

Bo Foged Jorgensen, Benny Mikkelsen, Cathal J. Mahon; "Analysis of Optical Amplifier Noise in Coherent Optical Communication Systems with Optical Image Rejection Receivers"; Journal of Lightwave Technology, vol. 10, Issue 5, May 1992 pp. 660-671.

A. H. Gnauck, S. Chandrasekhar, P. J. Winzer; "Dispersion-Tolerant 10-Gb/s Duobinary System Employing Heterodyne Detection and MLSE"; IEEE Photonics Technology Letters, vol. 18, Issue 5, Mar. 1, 2006; pp. 697-699.

A. H. Gnauck, K. C. Reichmann, J. M. Kahn, S. K Korotky, J. J Veselka, T.L Koch; "4-Gb/s Heterodyne Transmission Experiments Using ASK, FSK, and DPSK Modulation"; IEEE Photonics Technology Letters, vol. 2, Issue 12, Dec. 1990 pp. 908-910.

Ozan k.; Tonguz, Okan M. Tanrikulu, Leonid G. Kazovsky; "Performance of Coherent ASK Lightwave Systems with Finite Intermediate Frequency," IEEE Transactions on Communications, vol. 45, Issue 3, Mar. 1997; pp. 344-351.

N. Singh, V. K. Jain, H. M. Gupta; "Effects of Local Oscillator Excess Noise, Laser Phase Noise and Time Jitter on Digital Signalling Schemes in Coherent Optical Fibre Communication Systems"; IEEE Proceedings, vol. 137, Pt. J, Issue 2, Apr. 1990; pp. 115-123.

A. H. Gnauck, J. Sinsky, , P. J. Winzer, S. Chandrasekhar; "Linear Microwave-Domain Dispersion Compensation of 10-Gb/s Signals using Heterodyne Detection"; Optical Fiber Communications Conference, vol. 3, Mar. 2005, Postdeadline Paper PDP31; pp. 1-3.

John R. Barry, Joseph M. Kahn; "Carrier Synchronization for Homodyne and Heterodyne Detection of Optical Quadriphase-Shift Keying"; Journal of Lightwave Technology, vol. 10, Issue 12, Dec. 1992; pp. 1939-1951.

Dan Mohr, Christoph Wree, Don Becker, "Comparison of Simulation and Measurement Results of a High Speed Intersatellite Optical Communication System"; Paper presented at Defense and Security Symposium, Orlando, Florida, USA, 2006, Proc. SPIE vol. 6221; May 1, 2006; pp. 1-11.

C. Wree, D. Becker, D. Mohr, and A. Joshi; "Optical Coherent Receivers for 2.5 and 5Gb/s"; Paper presented at the 18th Annual Meeting of the IEEE Lasers & Electro-Optics Society, Sydney, Australia, Oct. 23-27, 2005, paper WMI, pp. 1-2.

D. Becker, C. Wree, D. Mohr, A. Joshi; "Optical Coherent Receivers for 2.5 and 10Gb/s"; Paper presented at the IEEE Avionics, Fiber-Optics and Photonics Conference, Minneapolis, Minnesota, USA, Sep. 20-22, 2005, paper WA3; pp. 1-2.

Christoph Wree, Donald Becker, Daniel Mohr, Abhay Joshi; "Measured Noise Performance for Heterodyne Detection of 10-Gb/s OOK and DPSK"; IEEE Photonics Technology Letters, vol. 19, No. 1, Jan. 1, 2007; pp. 15-17.

Abhay Joshi, Don Becker, Christoph Wree, Dan Mohr: "Coherent Optical Receiver System with Balanced Photodetection"; Paper presented at Defense and Security Symposium, Orlando, Florida, USA, 2006, Proc. SPIE vol. 6243; last modified May 1, 2006; pp. 1-14.

C. Wree, D. Becker, D. Mohr, A. Joshi; "Unpreamplified 10 Gb/s Heterodyne Detection of OOK and DPSK with Record Receiver Sensitivity"; Paper presented at the European Conference on Optical Communications, Cannes, France, 2006, paper We3.P.78; pp. 1-2.

D. Becker, C. Wree, D. Mohr, A. Joshi; Unpreamplified Heterodyne Detection of 10 Gb/s NRZ-OOK with High Receiver Sensitivity; Paper presented at the Asia-Pacific Optical Communications Conference, Gwangju, Korea, 2006; paper 6353-113; pp. 1-2.

D. Becker, C. Wree, D. Mohr, A. Joshi; "10 Gb/s Coherent System Deploying Stable, Low Linewidth Phase Locked Loop"; Paper presented at the IEEE Avionics, Fiber-Optics and Photonics Conference, Annapolis, Maryland, USA, 2006, Paper WB4; pp. 1-2.

Christoph Wree, Abhay Joshi, Don Becker; "Coherent Receivers Enable Next-Generation Transport"; Lightwave Technologies, Communications Applications, and Industry Analysis Worldwide; Jan. 2006; pp. 1-4.

CeLight Products and Services; http://www.celight.com/products/; Sep. 27, 2004; pp. 1-4.

* cited by examiner

VERTICAL SCALE: 300 mV/DIV; HORIZONTAL SCALE: 20 ps/DIV.

HORIZONTAL SCALE: 100 Hz/DIV; VERTICAL SCALE: 2 dB/DIV.

FEEDBACK-CONTROLLED COHERENT OPTICAL RECEIVER WITH ELECTRICAL COMPENSATION/EQUALIZATION

RELATED APPLICATION

The present Application is related to co-pending Provisional Application Ser. No. 60/781,233, filed Mar. 10, 2006, for "Optical Coherent Receiver System," takes priority therefrom, and incorporates by reference the teachings thereof to the extent they do not conflict herewith. The related Application has the same inventorship and assignee as the present Application.

GOVERNMENT INTEREST

The US Government has a paid-up license in this invention and the right in limited circumstances to require the patent owner to license others on reasonable terms as provided for by the terms of Grant No. MDA904-03C-0462, awarded by the NSA (National Security Agency).

FIELD OF THE INVENTION

The present invention is generally related to optical communication systems, and more particularly to optical coherent receivers for detecting optical signals.

BACKGROUND OF THE INVENTION

Coherent optical detection was considered intensively for fiber optics in the 80's and 90's. However, with the advent of the optical amplifier the work on this versatile and highly sensitive receiver technique was put aside. In the meantime great improvements on the optical components side have been achieved. These include laser output power, linewidth stability and noise as well as the bandwidth, power handling capability, and common mode rejection of (balanced) photo detectors. The advances in electronic microwave components improved in a way that the advantages of optical coherent detection over direct detection can be used. The present inventors recognize that this makes coherent optical detection very attractive for future communication links.

For free space optical communication links coherent detection was always of interest since it has to rely on high power laser and sensitive receiver techniques. One application is the optical satellite link which can equal or exceed the data throughput of an entire suite of microwave transponders. Moreover, the optical system has a much tighter beam size than all RF systems, making it intrinsically more secure. With the possibility of entire suites of RF transponders being replaced by a single optical communication system, the level of complexity of spacecraft (SC), and their associated weight and power consumption, all decrease.

Optical coherent detection offers a number of advantages over conventional intensity modulation/direct detection. For example, the use of an optical coherent receiver allows detecting signals of very low strength, lower than that of conventional optical receivers. This is especially important in order to detect signals at optical wavelengths where low noise optical amplification is not available. Moreover, coherent detection allows preserving the phase information of the optical signal. This is useful to detect optical signals where the information is comprised in the phase of the electromagnetic wave. This requires a stable phase and/or frequency lock between the received optical signal and the optical local oscillator used in the coherent receiver.

In the coherent receiver structure the received optical signal is mixed with the light of an optical local oscillator (LO). In this way, the signal is down converted from the optical carrier frequency (~200 THz at 1.55 μm) to a microwave carrier frequency (typically a few gigahertz). The resulting beat signal after photo detection exhibits a center frequency that corresponds to the intermediate frequency $f_{IF}$(IF), which is the difference between the signal frequency and the LO frequency.

If the signal frequency and the LO frequency are the same, the detection technique is called "homodyne." For different center frequencies of signal and LO, the system is referred to as "heterodyne," with $f_{IF}=f_c-f_{LO}$, where $f_c$ and $f_{LO}$ are the center frequencies of the received signal and LO, respectively. For heterodyne systems, the IF has to be at least two times the data rate of the optical signal to receive the double-sided data spectrum. Homodyne reception requires that the LO, typically produced by a laser, be phase locked to the incoming optical signal, whereas heterodyne detection calls for frequency locking to the received signal.

In many transmission scenarios, homodyne systems can provides higher sensitivity than heterodyne systems. Homodyne detection requires an RF bandwidth approximately equal to the transmitted data rate, whereas heterodyne detection requires an RF bandwidth approximately equal to two to three times of the transmitted data rate. From purely a bandwidth perspective, homodyne is less demanding than heterodyne detection. However, homodyne detection is more demanding in its implementation compared to heterodyne, mainly because of homodyne's strict requirement for phase locking.

The main building blocks of a coherent receiver include an optical local oscillator, optical coupler, balanced photodetector, phase/frequency locking, polarization control loop, and electrical signal processing. Within these blocks, there are several requirements necessary to achieve high receiver sensitivity:

1. A high-power, optical local oscillator with low relative intensity noise (RIN), low laser linewidth, and high optical isolation.
2. Polarization matching between the signal and LO laser.
3. Optical mixer with 50/50 coupling ratio on output ports.
4. Optical path length equalization into the balanced photodetector.
5. A balanced photodetector with high responsivity, high optical-power-handling capacity, and good common-mode rejection ratio (CMRR).
6. Phase/frequency locking to reduce the phase and frequency noise of the IF.

DESCRIPTION OF THE RELATED ART

In a conventional coherent optical receiver as shown in FIG. 1, the above listed requirements will exist with modifications existent between designs. However, the following operational drawbacks generally exist for these systems:

1. The polarization control is either manual in nature, or, is dealt with via a complex polarization diversity setup involving duplications of many opto-electronic (O/E) devices and RF components.
2. The optical path length equalization, if addressed at all, is done in the receiver fabrication process and is not controlled by feedback.
3. The coupling ratio of the optical mixing device is not feedback-controlled.
4. The responsivity match of the photodiodes is allowed to be in free-run mode, i.e., without feedback control.

5. The phase/frequency lock implementation is not amenable to fine control and optimization.

These drawbacks in a conventional coherent receiver can significantly impair both intrinsic

SUMMARY OF THE INVENTION

An object of the invention is to provide a highly reliable, multifunctional optical coherent receiver of reduced cost.

Another object of the invention is to provide a lightweight optical coherent receiver comprising in one module all of the required optical generation/management devices, as well as the O/E and RF circuitry.

Another object of the invention is to provide a fiber-based optical generation/management subsystem and integrated optical control circuit-based designs for minimizing weight and volume, while enhancing reliability of the associated optical coherent receiver.

Another object of the invention is to provide integrated circuit-based designs for minimizing the weight and volume of the opto-electronic and RF subsystems, while enhancing reliability of the associated optical coherent receiver.

These and other objects of the invention are met via several embodiments of the invention by including an optical generation/management subsystem, and providing integrated circuit optical, opto-electronic, and RF control boards of specified functionality. Coherent receivers with different functionalities can thus be generated by the appropriate optical subsystem and control board combination.

The above-stated drawbacks of conventional coherent receivers are uniquely addressed through this invention by way of embodiments of the invention including means for:

1. Use of feedback-controlled Avalanche photodiodes (APD's) to achieve perfect matching during operation.
2. Fine control of the phase/frequency lock.
3. Internally implemented feedback loops for the optical fiber stretcher, polarization control, and optical coupling ratio.
4. Use of autoscan to search, find, track, and lock onto an optical signal input.

Also in its various embodiments, the present invention provides an optical coherent receiver that includes means for achieving high sensitivity without reliance on erbium doped fiber amplification (EDFA). As a result, the present optical coherent receiver can be implemented both for free-space and fiber optical links. The present receiver further includes means for detecting various modulation formats such as ASK, (D)PSK, and FSK. The receiver further includes means for operating at many different wavelengths, such as 980 nm, 1064 nm, 1310 nm, and optical S band. The receiver further includes means for operating at 2.5 Gb/s and 10 Gb/s.

BRIEF DESCRIPTION OF THE DRAWINGS

Various embodiments of the present invention are described with reference to the drawings in which like items are identified by the same reference designation, wherein.

DETAILED DESCRIPTION OF THE INVENTION

Figure 1:
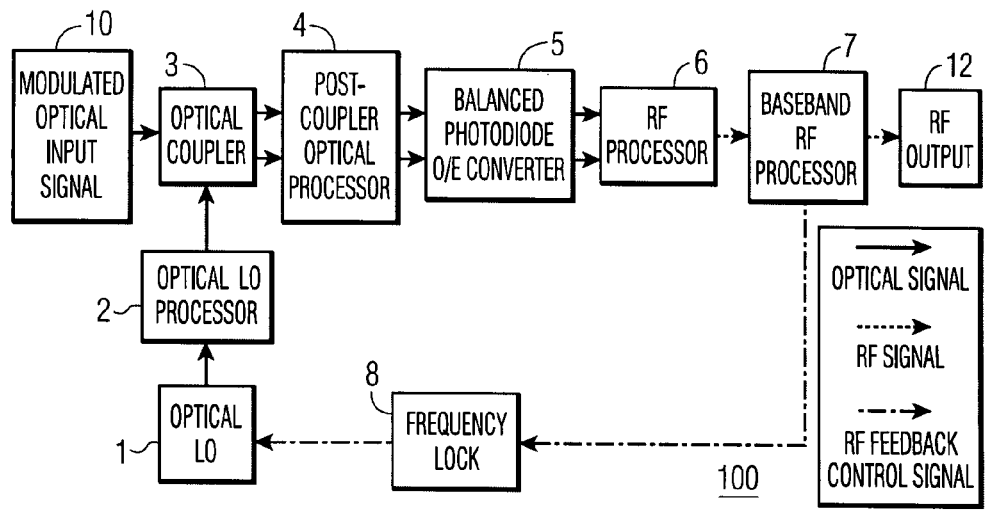
FIG. 1 is a block schematic diagram of a prior art coherent receiver design.

A brief description of operational drawbacks of a coherent receiver system as shown in FIG. 1 was previously provided. With further reference to FIG. 1, a known coherent receiver system is shown in the block schematic diagram of FIG. 1. As shown, the prior coherent receiver 100 includes an optical local oscillator (LO) 1 for outputting an optical signal to an optical local oscillator processor system 2, which in turn drives an optical coupler 3. The optical coupler 3 serves to receive a modulated optical input signal 10, and feed or couple the same to a post coupler optical processing circuit or network 4, which in turn couples the processed signal to a balanced photodiode and RF (radio frequency) amplifier 5. The RF output signal from the balance photodiode amplifier 5 is fed to an RF processing circuit 6, which in turn feeds an output signal to a baseband RF processing circuit 7, the output of which is connected both to an RF Output terminal or connector 12, and also to a frequency lock circuit 8, the output of which is inputted to the Optical LO 1.

The optical LO 1 provides a high-power optical continuous wave which is related in a fixed fashion to the frequency of the received signal. The optical LO processor 2 serves to isolate, and amplify, filter, and polarization stabilize the output signal from the optical LO 1. The optical coupler 3 combines the output of the optical LO processor 2, and the modulated optical input signal 10. The post-coupler optical processor 4 serves to optimize the coupling ratio of the optical coupler 3 and the balanced photodiode converter 5. The balanced photodiode converter 5 converts the mixed optical signal into the RF domain. The RF processor 6 in tandem with the baseband RF processor 9 serve to provide a demodulated RF output signal 12, and potentially supply a feedback signal to drive the frequency lock 8, the latter functioning to control the frequency of the optical LO 1 in relation to the frequency of the modulated input signal 10.

Figure 2:
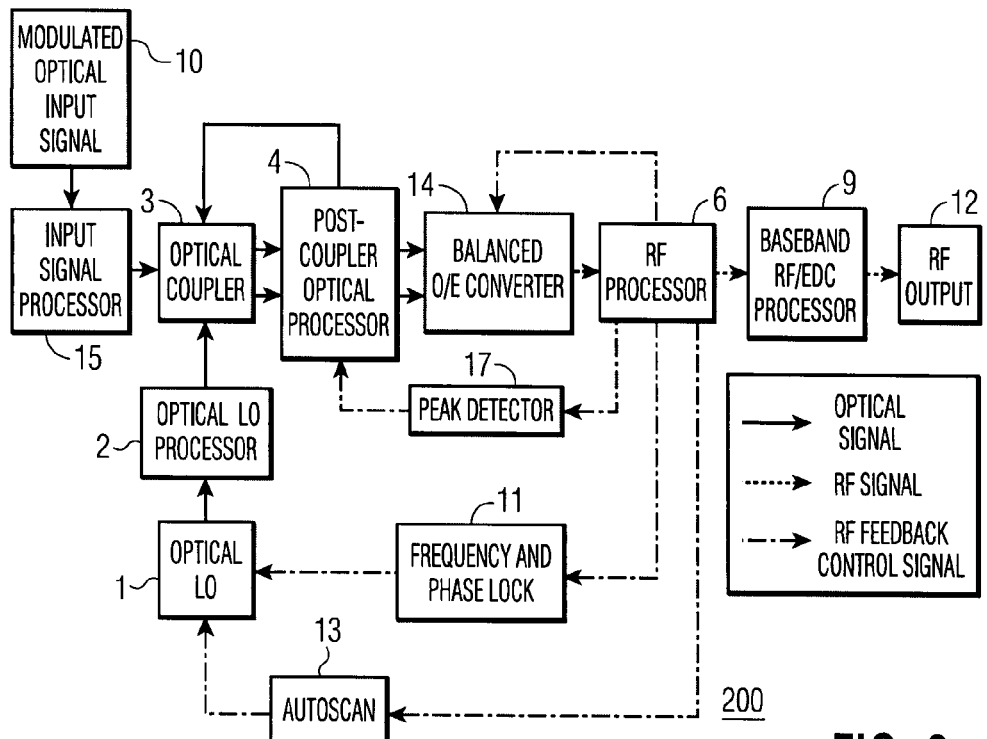
FIG. 2 is a block schematic diagram of a coherent optical receiver for one embodiment of the present invention.

A block schematic diagram for a coherent receiver 200 for a first embodiment of the invention is shown in FIG. 2. Note that for this first embodiment of the invention relative to the prior coherent receiver of FIG. 1, the former uses a baseband RF/EDC (radio frequency/electronic dispersion compensation/equalization) processor 9 in substitution of the baseband RF processor 7; a frequency phase lock circuit 11 in place of the frequency lock circuit 8; and the addition of an autoscan 13. Also, RF feedback control signals are connected from the output of the RF processor 6 to each of the peak detector 17, frequency and phase lock 11, autoscan 13, and balanced O/E converter 14.

In receiver 200, the optical LO processor 2 serves to isolate, amplify, filter, and polarization stabilize the optical LO signal 1, as in the receiver 100. The post coupler optical processor 4 serves to optimize the coupling ratio of the optical coupler 3, and also serves to equalize the path length between the optical coupler 3 and the balanced O/E converter, 14. The balanced O/E converter 14 consists of either a balanced avalanche photodiode (APD) pair or balanced conventional photodiode pair (PD), either of which serves to convert the optical output of 4 into an RF signal. The baseband RF/EDC processor module 9 functions to allow for electronic compensation of transmission impairments, baseband filtering, differential modulation processing, and amplification of the baseband signal. The frequency and phase lock module 11, functions to control frequency and phase of the optical LO 1 with respect to the modulated optical input signal 10. The autoscan module 13 functions to locate the wavelength of the modulated optical input signal 10 by changing the wavelength of the optical LO 1. The peak detector 17 serves to provide a control signal to optimize the operation of post coupler optical processor 4.

The optical coupler 3 can be provided by either a feedback-driven variable ratio optical 2×2 coupler or a 2×4 hybrid optical coupler. An optical feedback signal is connected from optical processor 4 to optical coupler 3, and provides a control signal to insure optimal operation of optical coupler 3.

The output current of the balanced coherent receiver is given by:

$$I_{out} = 2R\sqrt{P_{SIG}P_{LO}} \sin(\omega_{IF}t + \Delta\phi) \quad (1)$$

wherein R is the responsivity in Amperes/Watt of the balanced O/E device, and other of parameters, and variables as identified below.

With further reference to FIG. 2 and equation (1), for optimal receiver performance the following conditions must be maintained:

1. Complete DC cancellation of relative intensity noise (RIN) from a laser providing LO 1;
2. Matched polarization states of the signal, whose power is $P_{SIG}$, and LO 1, whose power is $P_{LO}$;
3. Perfect 50/50 coupling of the optical coupler 3;
4. Zero path length difference between the optical coupler 3 and balanced APD and RF amplifier 14;
5. Matched AC and DC responsivities of the balanced APD 14;
6. Constant phase difference ($\Delta\phi$) and wavelength difference ($\omega_{IF}$) between the LO 1 and signal via the phase locked loop (PLL) comprising modules 11 and autoscan module 13.

Figure 3:
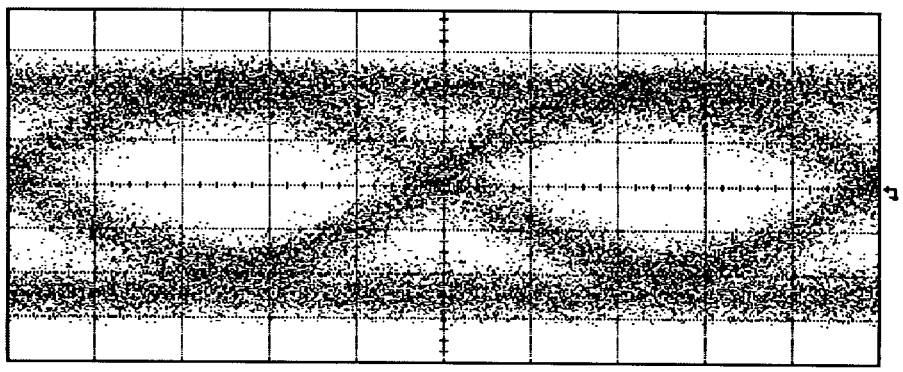
FIG. 3 is a 10 Gb/s NRZ-OOK eye diagram produced by a coherent optical receiver for one embodiment of the invention.

The coherent receiver 200 can approach the optimum performance under these conditions. A way of demonstrating the performance of the coherent receiver 200 is the evaluation of the so-called eye diagram after detection of a high-bit rate digital data stream. If the eye diagram has a wide vertical opening detection it can be anticipated that the signal incorporates very low or no bit errors. An eye diagram detected with the coherent receiver 200 at 10 Gb/s with a signal input power of −31 dBm is shown in FIG. 3. The corresponding measurement of the bit error ratio is $1 \cdot 10^{-9}$ (one of a billion bits is in error).

Figure 4:
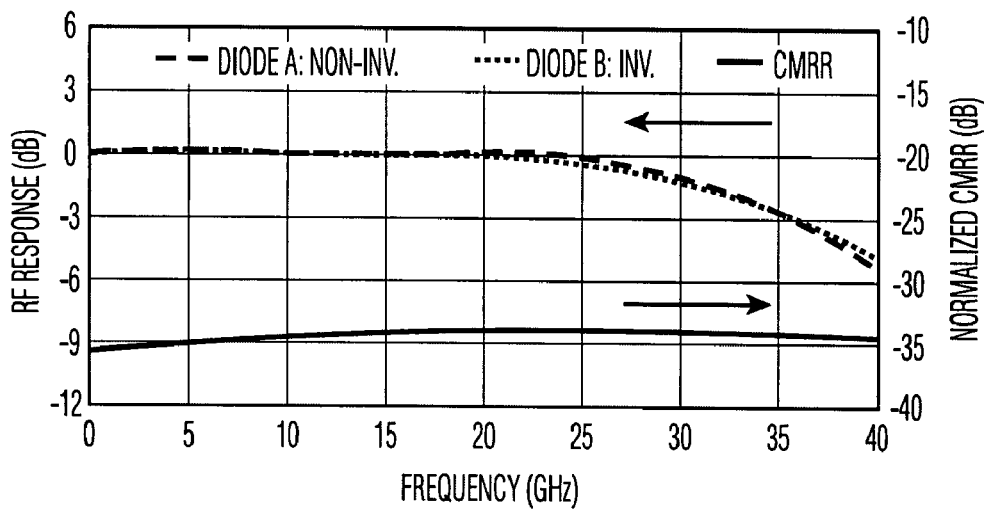
FIG. 4 shows RF response and CMRR curves of a DSC740 balanced photodetector produced by Discovery Semiconductors and used in embodiment of the invention.

There are several differences between the prior art coherent receiver 100 of FIG. 1, and the inventive coherent receiver of FIG. 2, with the latter providing:

The use of a high power handling, high CMRR (common mode rejection ratio) balanced photodetector 14 or balanced avalanche photodetector. The balanced photodetector 14 must be able to handle optical carrier signals with high modulation speeds. In an engineering prototype of the coherent receiver 200, the frequency response of a DSC740 balanced photodetector 14 Discovery Semiconductors (Ewing, N.J.) is shown in FIG. 4.

Synchronous demodulation for heterodyne reception is modulation-format adaptable.

The use of compensation electronics to properly account for optical distortions in medium-to-long haul optical networks.

Figure 5:
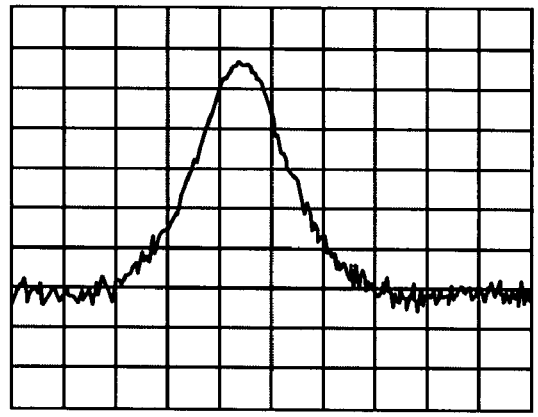
FIG. 5 shows an RF spectrum of the 130 Hz IF linewidth obtained using a coherent optical receiver of the invention.

The phase-lock/autoscan 11, 13 interface adjusts temperature of LO 1 to maintain a desired IF beat frequency. This feature is critical for analysis of WDM (wave division multiplex) systems, wherein data streams at different optical transmission wavelengths exist. The frequency lock module 11 helps to optimize receiver performance for all modulations, while the phase lock portion thereof is essential for all phase-shift modulations and homodyne reception. It operates without the need for RF or optical spectrum analyzers. Importantly, the frequency lock 11 prevents any drifts in the system, bringing long term stability to the receiver. To demonstrate the stability of the systems, the IF linewidth is shown in FIG. 5. It is reduced from approximately 2 MHz if no PLL (phase lock loop) is used to approximately 100 Hz if the PLL 11, 13 is closed. The receiver 200 can be used as an autonomous, field-deployable system.

The use of multiple feedback loops to drive the following system submodules to maximize system performance:
1. Polarization control of LO laser 1 and modulated optical input signal 10.
2. Variable ratio optical coupler 3.
3. Optical path length equalizer 28 (described below for FIGS. 6-9).
4. Bias voltage of balanced APD 14.

The invention in all of its embodiments is envisioned to provide a lightweight, low power consumption coherent receiver that can maintain these system submodules at optimized settings for best receiver performance. The invention is envisioned to provide broad optical wavelength coverage. The optical LO submodule 1 is widely tunable, and the autoscan submodule 13 can seamlessly modify the LO wavelength to coherently detect multiple optical signal 10 wavelengths, without the use of external optical or RF equipment. The receiver is thus suitable for field deployment.

Figure 6:
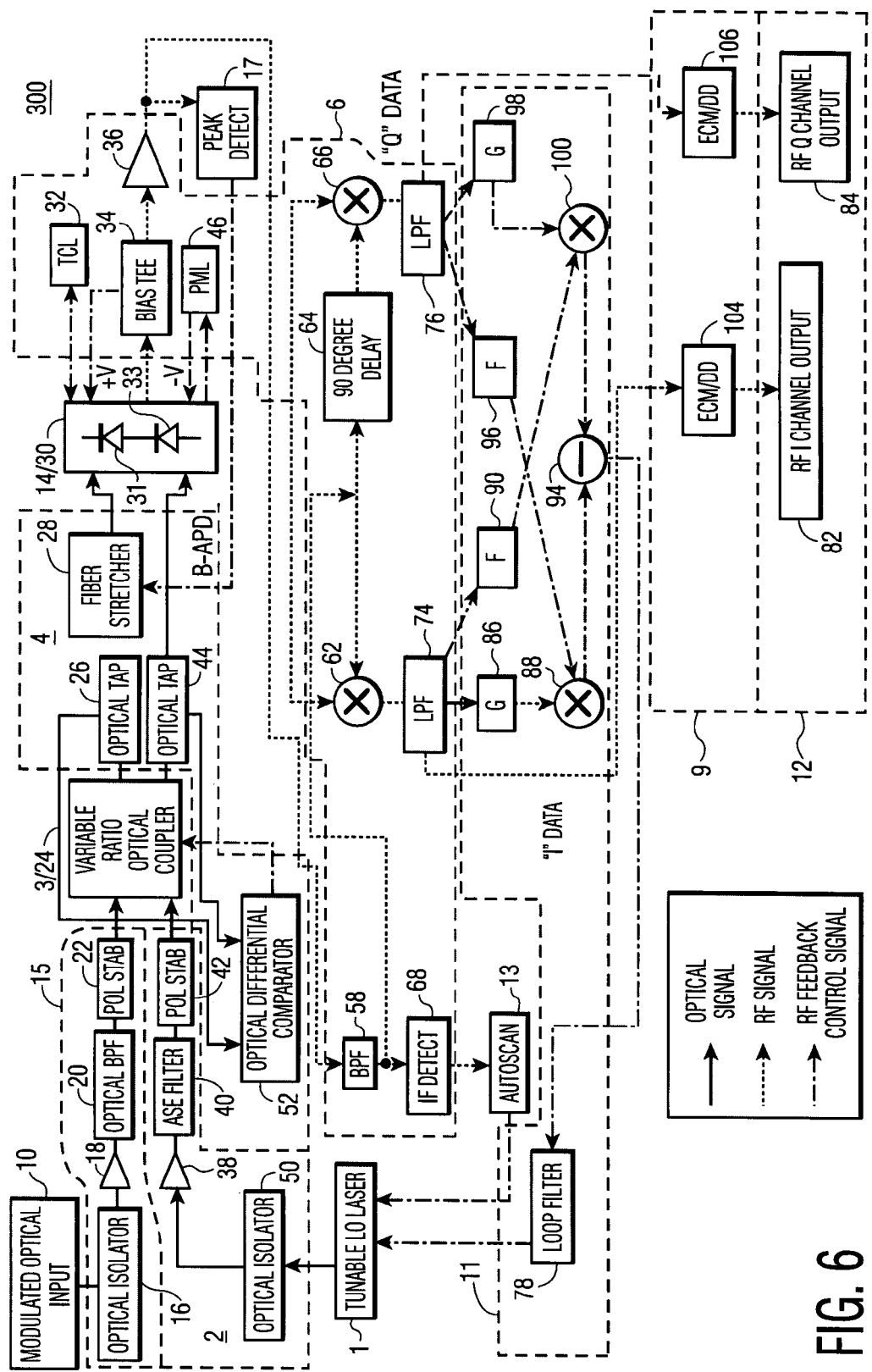
FIG. 6 is a block schematic diagram of a preferred embodiment of the invention for a heterodyne surveillance coherent receiver including a B-APD (Balanced Avalanche Photodiode).

As previously mentioned, the block schematic diagram of FIG. 2 shows the major modules and submodules for a first embodiment of the invention for the coherent receiver 200. In FIG. 6, a detailed block schematic diagram of the coherent receiver 200 shows greater details of the design of the various modules that are more generally shown in FIG. 2. In FIG. 6, components or modules of receiver 200 are configured in a preferred embodiment of the invention for providing a heterodyne surveillance coherent receiver 300, but is not meant to be limiting. In receiver 300, the RF processor 6 provides an intermediate frequency (IF) stage. Those of skill in the art may recognize alternative design implementations for the modules of FIG. 2.

In FIG. 6, the modulated optical input 10 provides the input optical signal to a signal optical isolator 16 which provides signal isolation to the modulated optical input 10. A low noise figure, high gain signal optical amplifier 18 optionally amplifies the output of the signal optical isolator 16. A bandwidth-appropriate signal optical bandpass filter 20 filters out out-of-band optical noise from the output of the signal optical amplifier 18. An optical signal polarization stabilizer 22 stabilizes the polarization state of the output of the signal optical bandpass filter 20. The tunable local oscillator (LO) laser 1 provides the optical input to the LO optical isolator 50, which provides optical isolation to the LO input 1. A low noise figure, high gain signal optical amplifier 38 optionally amplifies the output of the LO optical isolator 50. A narrowband LO optical bandpass amplified spontaneous emission (ASE) filter 40 filters out optical noise from the output of the LO optical amplifier 38. An optional LO polarization stabilizer 42 stabilizes the polarization state of the output of the LO optical bandpass filter 40. A variable ratio optical coupler 3/24 receives the outputs of the signal polarization stabilizer 22, and the optional LO polarization stabilizer 42. The two outputs of coupler 3/24 are $(E_{sig}+j^*E_{LO})/\sqrt{2}$ and $(j^*E_{sig}+E_{LO})/\sqrt{2}$. Optical taps 26 and 44 individually receive signal outputs from the variable ratio optical coupler 3/24. Each tap outputs 99/1 splitting of the input, whereby 99% is fed forward, and 1% is a feedback signal. An optical differential comparator 52 receives the feedback signals from optical taps 26 and 44, and outputs an electrical DC signal. The variable ratio optical coupler 3/24 receives the output signal from the optical differential comparator 52, which allows for a perfect 50/50 coupling ratio for the two outputs of coupler 3/24. A fiber stretcher 28 receives the feed-forward output of optical tap 26, and allows for optical path equalization between the fiber outputs of optical taps 26 and 44. A balanced avalanche photodiode (APD) pair, 31 and 33, housed in an RF package 14/30, respectively receive the optical outputs of fiber stretcher 28 and optical tap 44, and outputs a number of RF signals. A broadband bias tee 34 receives an RF output signal from the balanced APD 14/30 and passes the RF output signal to an amplifier 36, and a DC feedback DC signal to APD 31 to allow for AC responsivity balancing between APD's 31 and 33. A temperature control loop (TCL) 32 maintains high precision temperature stability of APD 31 (the positive-biased APD) and APD 33 (the negative-biased APD) devices in the RF package 14/30. A photocurrent monitor loop (PML) 46 drives the voltage of the negative-biased APD 33 for optimal operation. An impedance-matched broadband RF amplifier 36 receives the feed-forward output of the broadband bias tee 34, and amplifies the received RF signal for subsequent RF processing. A peak detect circuit 17 receives a portion of the RF output of the RF amplifier 36. The output of the peak detect circuit drives the fiber stretcher 28, in order to maintain equal path lengths between the fiber outputs of optical taps 26 and 44. A bandpass filter 58, receives a portion of the output from the RF amplifier 36, and outputs an IF beat note. An IF detect module 68 receives the output from the bandpass filter 58, and the former functions to output an RF signal at a specified reference frequency.

An autoscan module 13 receives the RF output from the IF detect module 68, and provides for wavelength adjustment of the LO laser 1.

Note that wherever "optionally" is used in describing the various embodiments of the invention, the use of the referred to optical component is meant to be a preferred embodiment whereas the component's use may not be necessary in certain applications.

The output of bandpass filter 58 is split and feeds An "I" data synchronous processing loop consisting of a double balanced mixer 62, which receives a portion of the RF output of the RF amplifier 36, and receives a portion of the output of bandpass filter 58. A low- pass filter 74 filters the out-of-signal band noise of the output of mixer 62. A double balanced mixer 66 receives a portion of the RF output of the RF amplifier 36. A 90° delay module 64 receives an output of the bandpass filter 58, and feeds the delayed output into the double balanced mixer 66. A low-pass filter 76, filters the out-of-signal band noise of the output of mixer 66. Two decision blocks F 90 and F 96, respectively, convert portions of the RF output of low-pass filters 74 and 76, respectively, into digital signals. Two sample-and hold RF modules G 86 and G 98 introduce a time delay of one clock duration. The sample-and hold RF module G 86 receives a second portion of the RF output of low-pass filter 74. The sample-and hold RF module G 98 receives a second portion of the RF output of low-pass filter 76. A multiplier 100 receives the outputs of G 98 and F 90. A multiplier 88 receives the outputs of G 86 and F 96. A subtraction module 94 receives the RF outputs of multipliers 100 and 88. A loop filter 78 receives an error signal output from subtraction module 94. The output of the loop filter 78 drives the tunable LO laser 1, in order to maintain a constant frequency and/or phase difference between the modulated optical input 10, and the tunable LO laser 1. An electrical compensation module, combined with an optional differential decoding circuit 104, receives a portion of the RF output of the low-pass filter 74. An electrical compensation module combined with an optional differential decoding circuit 106 receives a portion of the RF output of the low-pass filter 76. An I-channel RF output port 82 receives the output of the differential decoding circuit 104. A Q-channel RF output port 84 receives the output of the decoding circuit 106.

With further reference to FIG. 6, as previously described, the modulated input optical signal 10 to the generic heterodyne surveillance coherent receiver 300 is first input to an optical isolator 16, then optionally fed through a low-noise optical amplifier 18, the output of which is connected to the input of an optical bandpass filter 20, with data-appropriate bandwidth. The filtered optical signal is then fed into a polarization stabilizer 22. This stabilizer 22 operates with a single-mode fiber input, and can be adapted to accept low-level optical signals. It is preferred that the output from the polarization stabilizer 22 is polarization-maintaining (PM) fiber, for insuring that the polarization state is maintained in the appropriate state of polarization (SOP).

The LO laser 1, which is a PM fiber-pigtailed device with a fixed state of polarization, is connected into a PM two-stage optical isolator 50, in this example. The laser is chosen for lowest RIN (relative intensity noise) and linewidth, while still being amenable to feedback drive circuitry. The output from this isolator 50 is carried on a PM fiber, and is optionally fed into a low-noise optical amplifier 38 and to an optical amplified spontaneous emission (ASE) filter 40. The output of the ASE filter 40 is then fed into a polarization stabilizer 42 with a chosen output SOP. For heterodyne applications, both the optical signal and LO laser 1 will have aligned SOPs.

Fiber outputs or optical signals from optional LO polarization stabilizers 22, 42 are inputted to a variable ratio optical coupler (VROC) 3/24. The coupling ratio of the coupler 3/24 is feedback-controlled via an RF output from the optical differential comparator, 52, to maintain highest system performance. As previously mentioned, two optical outputs of the VROC 3/24 are both fed into 99:1 optical tap couplers (OT) 26 and 44, respectively. Ninety-nine percent of the input power to each tap 26, 44 is fed through to the balanced APD avalanche photodiode 14/30, which consists of a positive biased APD 31 and a negative biased APD 33, in this example. One percent of the input to the tap couplers 26, 44 is fed into the optical differential comparator 52, which internally consists of a balanced photodiode followed by an analog comparator that operates at a predetermined commutation frequency. The RF output signal of the optical differential comparator 52 drives the voltage-controlled VROC 3/24, as shown. When the VROC 3/24 is set at a 50/50 setting, it is driven by a null voltage. This loop provides real-time voltage-controlled coupling stability to the VROC 3/24 with a negligible insertion loss of <0.05 dB.

There are two output fibers or optical output signals from the optical taps 26 and 44. The optical output signal from optical tap 26 is connected into a low loss (<0.5 dB) piezoelectric controlled fiber stretcher (FS) 28. The stretcher 28 has an analog input feedback port driven by an RF signal from peak detector 17 located in close proximity to the stretcher 28. This feedback loop is designed to maintain the highest system performance, and represents an active optical delay control loop. The optical output signals from the fiber stretcher 28 and the optical tap 44, are carried by optical fibers which are directly pigtailed into the balanced avalanche photodiodes (APD) 31 and 33 of B-APD 14/30. Equal optical path lengths between the optical coupler 3/24 and balanced APD 14/30 are maintained for optimal receiver performance.

The avalanche photodiode pair 31 and 33 are actually each avalanche photodiode pairs independent of one another, and are individually biased, wherein each have sufficient bandwidth to process RF frequencies from [IF−0.7*(bit rate)] to [IF+0.7*(bit rate)]. APD 14/30 is designed to operate over a wide range of optical input powers, and can operate under linear conditions for large average optical inputs. Typically, APD devices, such as B-APD 14/30, are grown to achieve a low excess noise figure of <2 dB. The B-APD 14/30 consisting of avalanche photodiode pair 31, 33 is built up in a microwave package to produce matched RF responses therebetween across the required bandwidth range of the RF signal. At high input optical powers, the B-APD 14/30 can achieve a multiplication factor of M=1.5. The exact value of M depends upon the reverse bias applied across the avalanche photodiode pair 31, 33 of B-APD 14/30, and their temperature. As is typical for such devices, B-APD 14/30 is assembled on a thermoelectric cooler (TEC) along with a thermistor inside the RF package. These elements along with additional circuitry are designed to maintain high precision temperature stability of the B-APD 14/30 in its package, thereby providing a temperature control loop (TCL).

The APD 33 has its reverse voltage preset for optimal operation via a photocurrent monitor loop (PML) 46. This is the active B-APD 14/30 gain set control loop. The output signal of the B-APD 14/30 is connected through the DC port of a wideband bias tee (BT) 34. Feedback circuitry driven by BT 34 is designed to control the bias of the APD 31, in order to achieve matched AC responsivity throughout the frequency range of the RF signal. This voltage is integrated over MANY bit pattern cycles and applied to the 'Slave' APD 31 to constantly adjust for near perfect balance. With this B-APD 14/30 respective pairs of avalanche photodiodes 31 and 33, and the associated feedback circuitry 46, precise balancing between the balanced channels is achieved. This is the B-APD 14/30 balance control loop. When the feedback voltage drive through the bias tee is nulled, then the DC responsivities of the avalanche photodiodes 31 and 33 within B-APD 14/30 are matched, and laser 1 RIN (relative intensity noise) is minimized for optimal receiver performance.

B-APD 14/30 converts the optical input signals into an RF output signal. The RF output signal of the balanced B-APD 14/30 which consists of avalanche photodiodes 31, 33 is fed via BT (bias tee) 34 into a well-isolated 50-ohm impedance low noise amplifier chain 36. This amplifier chain 36 supplies uniform gain with low group delay over the RF received passband, and provides sufficient non-compressed RF power to appropriately drive the subsequent RF mixers 62 and 66.

The amplified RF signal is split into four paths. As described above, one path provides an input to peak detector 17. A second path drives a bandpass filter 58, which feeds an IF detector circuit 68, which feeds an autoscan circuit 13, which drives a tuneable local oscillator 1. The third and fourth paths are feeding the inputs to the double balanced mixers 66 and 62, respectively, which are used for processing the information on the in-phase (I) and quadrature (Q) component of the modulated input. For arbitrary optical modulation the in-phase and quadrature component of the optical signal can be modulated with independent data streams. This is generally referred to as quadrature amplitude modulation (QAM). The I and Q processing structure allows to retrieve any data modulation on the I and Q component of the optical signal. The I-channel processing components include mixer 62, LPF 74, decision block 86, mixer 88, subtractor 94, and F decision block 90. The Q-channel processing components include mixer 66, LPF 76, F decision block 96, G decision block 98, mixer 100, and subtractor 94. The output of bandpass filter 58 is split into two parts, one which feeds the IF detect module 68, and a second that is subsequently split and feeds the I-channel double balanced mixer, 62, and a 90 degree delay module 64. Mixer 62 performs a synchronous downconversion of the "I" data stream. The output from mixer 62 is fed into a low-pass filter (LPF) 74. The output of LPF 74 is split into three parts. The first output of LPF 74 is fed into an electrical compensation module with optional differential decoder (ECM/DD) 104. The output of ECM/DD 104 is the RF I channel output 82, which detects the modulated data on the in-phase part of any optical modulation format, which is generally addressed as quadrature amplitude modulation (QAM). The differential decoder section of ECM/DD 104 can be operated to demodulate differentially encoded modulation formats. The other two portions of the filtered I data are available for error signal processing. These signals are sent through digitally-based RF decision blocks F 90 and decision block G 86. The output of block F 90 is input to a multiplier 100. The output of block G 86 is fed into multiplier 88.

The output of the 90° delay module 64 is fed into DBM 66. DBM 66 performs a synchronous downconversion of the "Q" data stream. The output of 66 is fed into a low-pass filter (LPF) 76. The output of LPF 76 is the "Q" data and is split into three branches. One branch is fed into an electrical compensation module with optional differential decoder (ECM/DD) 106. The output of ECM/DD 106 is the RF Q channel output 84 which detects the modulated data on the quadrature-phase part of any optical modulation format, which is generally addressed as quadrature amplitude modulation (QAM). The differential decoder section of ECM/DD 106 can be operated to demodulate differentially encoded modulation formats.

The other two portions of the filtered Q data are available for error signal processing. These signals are sent through digitally-based RF decision blocks F 96 and G 98. The output of block F 96 is input to multiplier 88. The output of block G 98 is fed into multiplier 100.

The outputs of multipliers 88 and 100 are fed into an RF subtraction module 94. The output of module 94 is an error signal that drives the loop filter 78. The output of filter 78 drives the tunable laser LO 1 and insures strict frequency and phase locking of LO 1 is maintained.

The autoscan circuit 13 automatically scans the laser LO 1 via temperature control so that a frequency lock between the LO 1 and the input signal 10 is maintained at the IF beat frequency. The laser LO 1 is coarsely tuned in wavelength by changing the temperature. A change from a lower temperature to a higher temperature increases the wavelength of the laser LO 1. Utilizing a Digital-to-Analog Converter (DAC) this temperature can be scanned from a low temperature to a higher temperature by the use of digital counters (not shown) with a clock set at an appropriate rate for a controlled scan or 'tuning' of the laser LO 1. Referring to FIG. 5, the 'beat' of the unknown signal can be searched for by starting a scan at the low temperature range and proceeding to the high temperature range. The bandpass filter 58 set at the Intermediate Frequency (IF) of interest will eventually pass a carrier associated with the heterodyne (or beat) between the LO 1 and the unknown signal. This 'carrier' is detected with the autoscan circuitry in order to lock the LO laser to the incoming optical signal.

The experimental way of "finding" the 'beat' between two lasers to produce an IF with a coherent/heterodyne system normally involves a few pieces of expensive equipment. The two lasers being used in such an experimental setup typically on an optics bench require connection to an 'OSA' Optical Spectrum Analyzer. This instrument will show the two different laser wavelengths simultaneously. One laser is then tuned to move the wavelength close to the other. The resolution of the OSA is such that usually one can get the pair of lasers to be observed as a single output 'blip'. However, a finer degree of wavelength/frequency determination is required by an RF Spectrum Analyzer. The laser outputs must be optically mixed in a fiber coupler followed by O/E (optical-to-electrical) conversion, usually by a wide bandwidth photodiode. If the laser wavelengths are tuned close enough within the frequency range of the Spectrum Analyzer, for example less than 40 GHz, then an RF signal (the IF) will be observed. A way of finely tuning and also maintaining the wavelength stability of the lasers is helpful and required. The application used in this embodiment of this invention, uses lasers employing temperature and current to finely adjust and stabilize the IF 'beat' but does not exclude other methods.

Figure 11:
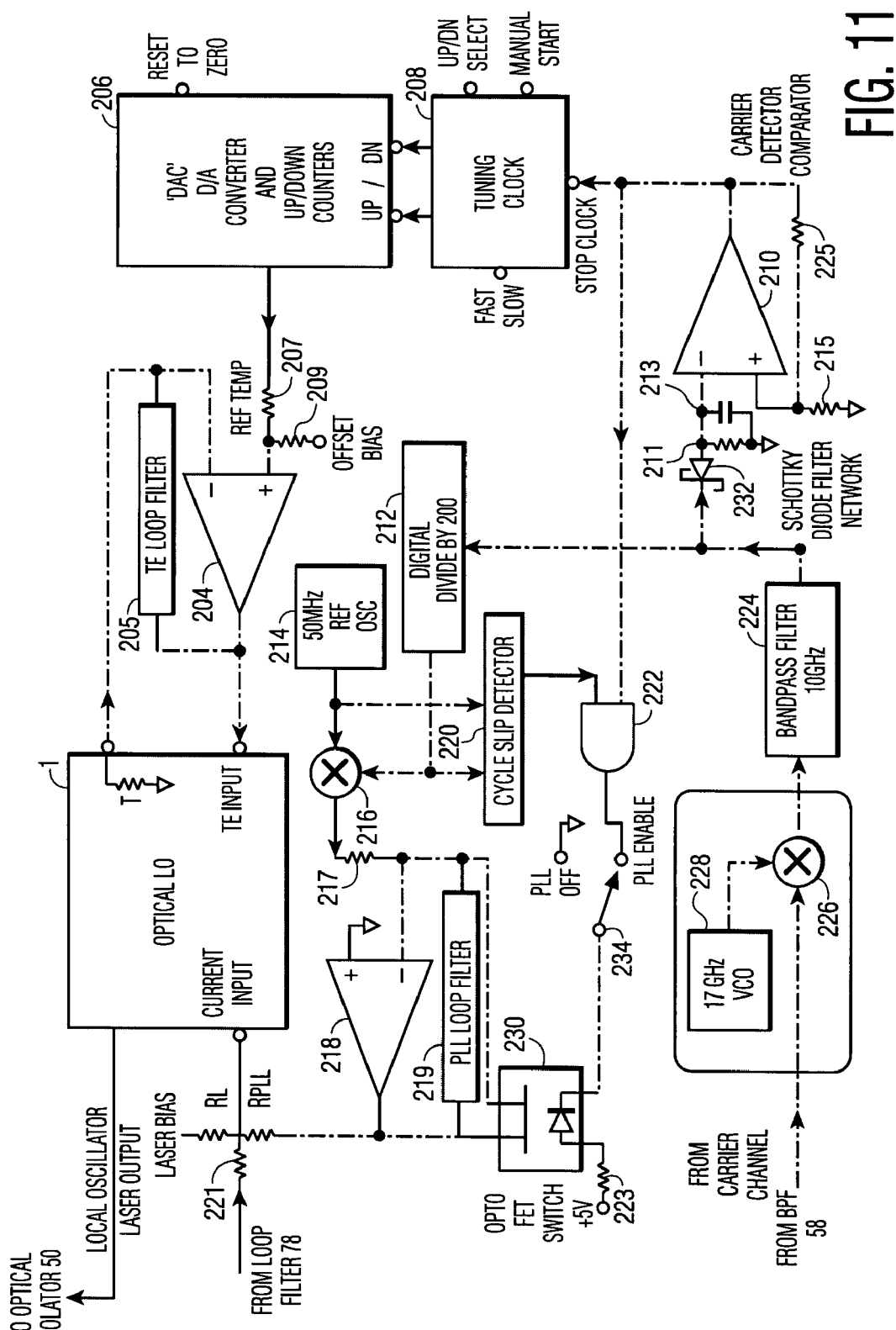
FIG. 11 is a block schematic diagram showing details of the IF Detect, and autoscan modules, in combination with the Optical Laser Oscillator.

The autoscan 13 of FIG. 6, as shown in detail in FIG. 11, consists of a differential amplifier 204, oscillator 214, D/A 206, clock 208, amplifier 210, Schottky diode 232, BP filter 224, AND gate 222, SPST switch 234, opto FET switch 230, PLL loop filter 218, cycle slip detector 220, and multiplier 216. The IF DETECT module 68 of FIG. 6 consists of a voltage controlled oscillator 228, multiplier 226, and BP filter 224 as shown in FIG. 11. The autoscan 13 section or module scans the wavelength of the LO laser 1, in a course adjustment by temperature control, and in a fine adjustment for phase locking by current control. One type of available laser is supplied in a small sealed device. As packaged, the laser of the optical LO 1 is internally mounted on a 'TE' thermoelectric cooler (not shown) along with a thermistor 'T' to easily monitor the temperature as shown in FIG. 11. The 'TE' input of the Laser Package for the optical LO 1 is driven by a differential amplifier 204. A TE loop filter 205 is included in the feedback loop for amplifier 204. Temperature sensing from LO 1 is provided by thermistor 'T,' which is connected to amplifier 204 to provide feedback for precise temperature regulation. The reference set point temperature for amplifier 204 is determined by D/A converter 'DAC' 206 connected and digitally selected by up down counters using designs known by those skilled in the art. The temperature resolution which is responsible for the frequency resolution of the LO laser 1 tuning is set by the DAC 206 number of bits, the DAC 206 reference voltage, and resistors REF TEMP 207, and OFFSET BIAS 209. The offset bias circuitry is used to center the DAC 206 tuning range within the temperature specifications of the LO laser 1 being used. For example, but not limited to a +5 volt reference, the 12 bit DAC 206 is used for a typical resolution per DAC 206 bit of nominally 60 MHz.

The autoscan 13 circuitry operates by digital clocking the DAC 206 up/down counters. This will increase or decrease of the laser temperature of LO 1. This "tunes" the wavelength/frequency of laser oscillator LO 1 so that the "beat" is detected and stops the digital counting.

The autoscan 13 is initiated as follows: DAC and up/down counters 206 can be "SET TO ZERO". This sets the temperature reference to the lowest temperature for laser oscillator (LO) 1. The "MANUAL START" will enable tuning clock 208 to count up at a "FAST or SLOW" selected rate. A "beat" between the laser LO 1 and the modulated optical input 10 is recognized by a signal output from bandpass filter 224. Schottky diode 232, and a filter network including resistor 211 and capacitor 213, detects the amplitude of the "beat". The output of Schottky diode 232 and filter network 211, 213 is connected to carrier detector comparator amplifier 210. The output of carrier detector comparator 210 is connected to AND gate 222 and tuning clock 208 input. Stop clock signal stops the temperature "tuning" by halting the UP/DN counter clock of DAC 206. Note that the amplifier 210 has its non-inverting terminal terminated to ground via resistor 215, and a feedback resistor 225 is connected between its non-inverting terminal and output terminal, providing hysteresis.

The temperature tuning can be very slow because of the thermal time constants inherent to the laser package of LO 1. For faster "tuning" a FAST clock set for example at but not limited to 20 Hz can be selected to scan/tune to quickly access the desired signal. However, when the "beat" detection occurs and stops the DAC 206 counters, the temperature will 'overshoot' out of the bandpass filter 224 detection circuit range. Then the "DOWN" slow clock can be set for example at but not limited to 1 Hz to precisely bring the "beat" into the detection circuit range without overshoot. In conclusion, temperature control of the laser LO 1 is feedback controlled by the amp/loop filter and the temperature to be set for tuning of laser LO 1 wavelength/frequency by DAC 206.

Current input for the Laser Package of LO 1 requires a current which can be set to provide near the maximum optical output and fine current adjustment control for phase locking. The Laser Package laser LO 1 current input is fed by a laser bias voltage connected to resistor $R_L$. Typically, but not limited thereto, the bias voltage is −3.5 volts, and resistor $R_L$ is 10 ohms. The 'PLL' (Phase Lock Loop) drive to the laser is via Amplifier 218, PLL Loop Filter 219, and resistor $R_{PLL}$ selected for optimum loop gain. Amplifier 218, PLL Loop Filter 219 is reset to zero volts by OPTO FET Switch 230.

The following description will trace the operation of the autoscan 13 topology for the embodiment focusing on the phase lock loop 11. In the heterodyne configuration of FIG. 6, the output of the RF amplifier chain 36 is split into four parts. The part feeding into BPF 58 is called the carrier channel. This discussion deals with the carrier channel.

DUAL CONVERSION CARRIER CHANNEL: The carrier channel may have, but is not limited to an IF (intermediate frequency) of 27 GHz. This IF frequency may be ideal for the signal point of view, but may not be ideal for the carrier section used for phase locking. With reference to FIG. 11, by using mixer 226 and 'Voltage Controlled Oscillator' (VCO)

228 set at, for example but not limited thereto, 17 GHz, a down conversion to 10 GHz will be achieved. This will be fed to a 10 GHz bandpass filter 224 then on to the PLL 11 circuitry. This dual conversion carrier channel enables the system to choose an IF appropriate for the signal channel but can use a carrier channel PLL 11 design of 10 GHz, for example. It is convenient to have a versatile system for various signal IF frequencies without having to redesign a different PLL 11 channel for each different ideal signal IF frequency. In a simpler embodiment for an application requiring for example but not limited to a 10 GHz signal IF, this Dual Conversion section can be eliminated. The carrier channel would be inserted directly into bandpass filter 224, thereby eliminating use of VCO 228 and mixer 226.

The Carrier Channel, as described above, however it is produced, connects to bandpass filter 224 set for this embodiment to, but not limited to, 10 GHz. The output of bandpass filter 224 is fed to both Schottky diode 232 and filter circuitry 211, 213, and digital divider 212 divides by 200.

In the following, we will first follow the digital divider 212 section circuit path. The digital divider 212 is of a known design. For this example, digital divider 212, 213 is set for, but not limited to, a divide by 200, as previously mentioned. As a result, the 10 GHz carrier channel of this example will be divided down to a frequency of 50 MHz, as compared with the 50 MHz REF OSC 214 via the Exclusive-OR mixer/phase comparator 216, for example.

The output of mixer/phase comparator 216 drives via coupling resistor 217 Amplifier 218, and PLL Loop Filter 219, which then drives via resistor $R_{PLL}$ the "Current Input" of the Laser Package for laser LO 2. When this phase lock loop 11 is locked, LO 1 will produce a "Local Oscillator Laser Output" wavelength/frequency value to "beat" with the modulated optical input 10 wavelength/frequency and produce, for example but not limited to, a 27 GHz IF. This IF will be frequency and phase locked to 50 MHz REF OSC (reference oscillator) 214. Note that in this example, resistor $R_L$ couples a laser bias voltage to the current input of optical laser oscillator LO 1. Also a resistor 221 couples the output of loop filter 78 to the latter.

The following discussion is for identification of the desired "beat" and decision to lock circuitry embodiment. For decades there have been available many highly successful conventional PLL single chip devices. They operate by driving, with proper polarity from the output of a loop filtered phase comparator, a voltage controlled oscillator (VCO) to "phase lock" to a reference frequency. There are two characteristic types or versions of mixer/phase comparators. One version is an edge sensitive type that can contain digital Flip-Flop circuitry for frequency discrimination called a frequency/phase comparator or detector. This has the advantage of not locking onto harmonics of the reference frequency but has the disadvantage of being very susceptible to noise because it is using the "edges" of the signals for comparison/detection. The second version is a quadrature type of mixer/comparator, and can be in an analog configuration such as typically called a "Gilbert cell," or in an "up side down Christmas tree" mixer/detector configuration. It also can be designed as a digital configuration using an exclusive OR gate. These alternative configurations can lock onto harmonics but can have the advantage to be configured to obtain very high noise immunity. Either type of these mixer/comparator configurations when set up in a standard PLL configuration WHEN OUT OF LOCK will cause the output of the loop filter 219 to NOT be at zero volts but be "clipped" against one power supply rail (not shown).

For PLL 11 topologies there can be three specific items to be monitored during a successful lock. In usual applications there are three items to monitor: first, a phase locking of the signal of interest to a reference frequency, secondly after the loop is phase locked there can be included a lock indictor, and thirdly an amplitude detector can also be included. The embodiment of the Phase Lock Loop 11 of this invention combines the ability to discriminate against harmonic locking and obtain high noise immunity. When out of lock, PLL 11 will place the loop filter amplifier 218 at zero volts rather than "clipped" against one power supply rail. This is accomplished by reversing the order of the three specific items in the monitoring sequence stated above. First Schottky diode 232 and filter network 211, 213 detect the amplitude of the "beat". The output of Schottky diode 232 and filter network 211, 213 is connected to Carrier Detector Comparator amplifier 210. The output of Carrier Detector Comparator amplifier 210 is connected to AND gate 222 and Tuning Clock 208 STOP CLOCK input, stopping the "tuning" as described above. When the carrier amplitude, which is converted to a DC voltage representative of the Carrier amplitude, is above a threshold set by Carrier Detector Comparator amplifier 210 (and associated circuitry) the output thereof will go "HI," indicating a carrier of proper amplitude within the bandpass filter 224 has been detected. This carrier has gone through bandpass filter 224, so its frequency is known and means the "beat" is very close to the desired IF. Second, now the "beat" is very close to the desired IF, 50 MHz REF OSC 214 and digital divide 212 by 200 is connected to Cycle Slip Detector 220.

The basic cycle slip detector 220 operation is such that if one input receives one clock signal and the other input receives another clock signal regardless of the phase between them or which one came first, the output will be enabled in this example by going "HI" (high). In other words, the two signals are of the same frequency but their phase relationship doesn't matter with this circuit. If either input gets more than one clock pulse or signal before the other receives a clock signal, then the output is disabled or in this example goes "LO" (low). This is a same frequency detector but not a phase detector. This is the same type of circuitry used in normal PLL applications to indicate that the loop is locked. A cycle slip detector can be designed with Flip-Flops and logic Gates as known by one skilled in the art. When AND gate 222 receives individual inputs from cycle slip detector 220, and from the output of amplifier 210, its output goes "HI" with switch 234 set to AUTO PLL ENABLE, causing OPTO FET SWITCH 230 to be open circuited, thereby enabling Amplifier 218 and PLL Loop Filter 219 connected to the Current input of optical LO 1 through resistor $R_{PLL}$. This will enable the PLL to lock. Switch 234 PLL OFF/PLL ENABLE can be used to manually disable the PLL. Note that a resistor 223 connects to +5 VDC to the opto FET switch 230.

The prior art would have to use an Optical Spectrum Analyzer (OSA) to find the LO laser wavelength and the unknown signal wavelength. Next, the temperature of the LO laser would need to be changed until the two wavelengths are very similar. Because the OSA does not have sufficient wavelength resolution, an RF spectrum analyzer must now be used after O/E conversion to further fine tune the temperature to get very close to the desired IF. Both of these instruments are large, heavy, and costly. Various wavelength division multiplex (WDM) transmission channels can be studied and analyzed using this feature.

Note that the RF component characteristics in the coherent receiver embodiment of FIG. 6 are appropriately chosen to process the optical heterodyne signal in the optimal fashion.

Figure 7:
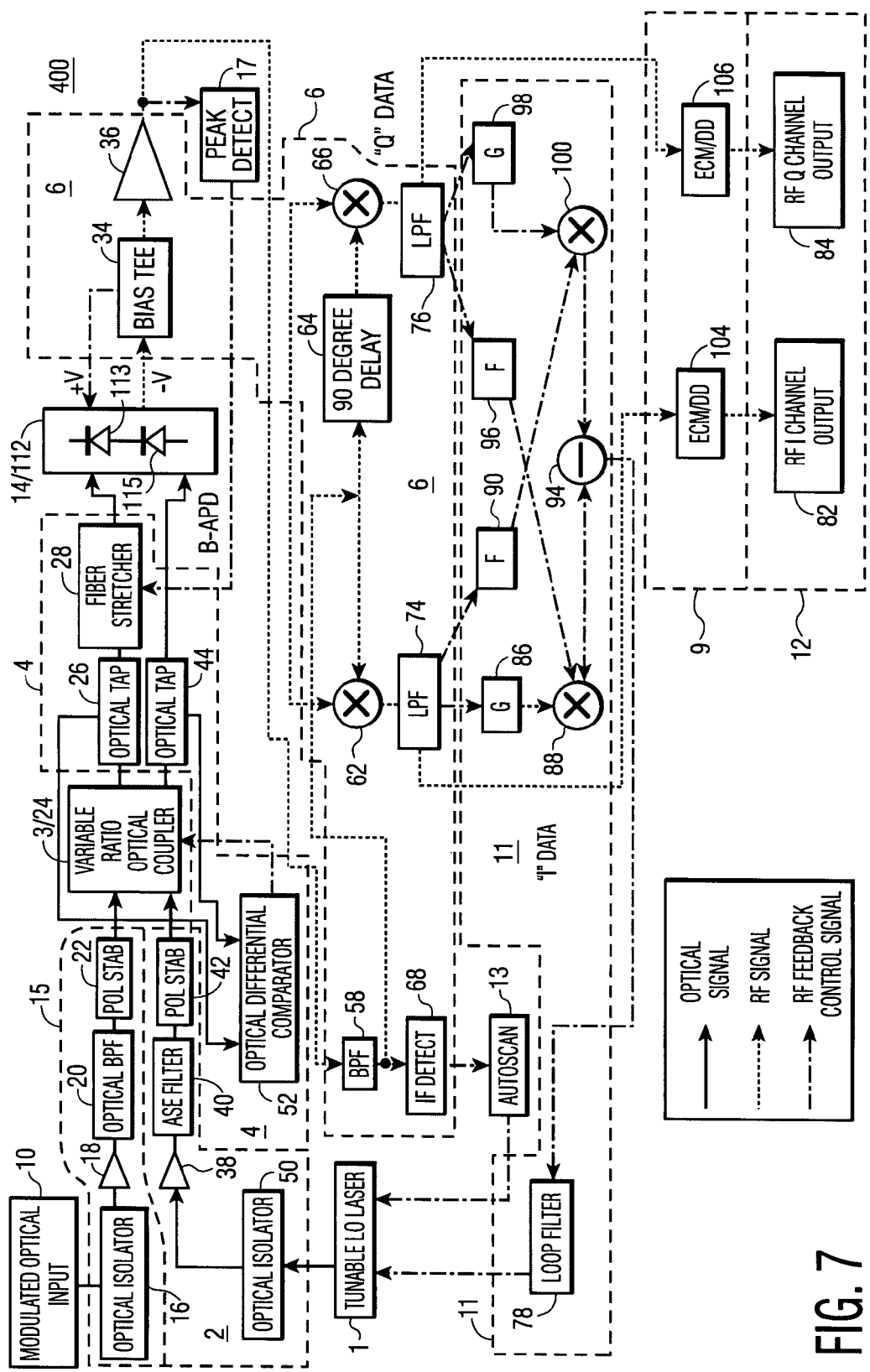
FIG. 7 is a block schematic diagram of another embodiment of the invention for a secondary embodiment of the heterodyne surveillance coherent receiver including a B-PD (Balanced Photodiode).

With reference to FIG. 7, an enhancement of the invention for configuring the modules of receiver 200 to provide a heterodyne surveillance receiver 400 with balanced photodiodes (B-PD) 14/112 is shown. Balanced PIN photodiodes 113 and 115, residing in RF package for B-PD 14/112, have sufficient RF bandwidth to process RF frequencies from [IF−0.7*(bit rate)] to [IF+0.7*(bit rate)]. The photodiode pair 113, 115 may be required for higher IF value or higher bit rate digital transmissions, if the B-APD 14/30, shown in FIG. 6, does not have sufficient RF bandwidth. The DSC740 of Discovery Semiconductors, Inc., using balanced photodiodes has a 35 GHz bandwidth, and can be used for the present 10 Gb/s heterodyne receiver. The DC responsivity of the balanced photodiodes 113, 115 is approximately 0.7 A/W, while that of the B-APD 14/30 can be approximately 1.5 A/W. The lower DC responsivity of the balanced PIN diodes 113, 115 will lead to degraded sensitivity performance of the secondary embodiment of the invention shown in FIG. 7. Also, no feedback loops are applied to the B-PD package 14/112, so the receiver 400 performance may be slightly degraded versus the preferred receiver 300 embodiment of the invention, shown in FIG. 6. This is explained by the fact that the feedback loop applied to the balanced APD pair serves the purpose of equalizing the DC responsivities of the two APD's 31, 33 to more completely cancel the RIN of the LO laser 1, which improves sensitivity performance of the preferred embodiment of the receiver of FIG. 6, over the performance of the B-PD package 14/112 based secondary embodiment of FIG. 7. Otherwise, the receiver 400 of FIG. 7 operates in the same manner as receiver 300 of FIG. 6.

Figure 8:
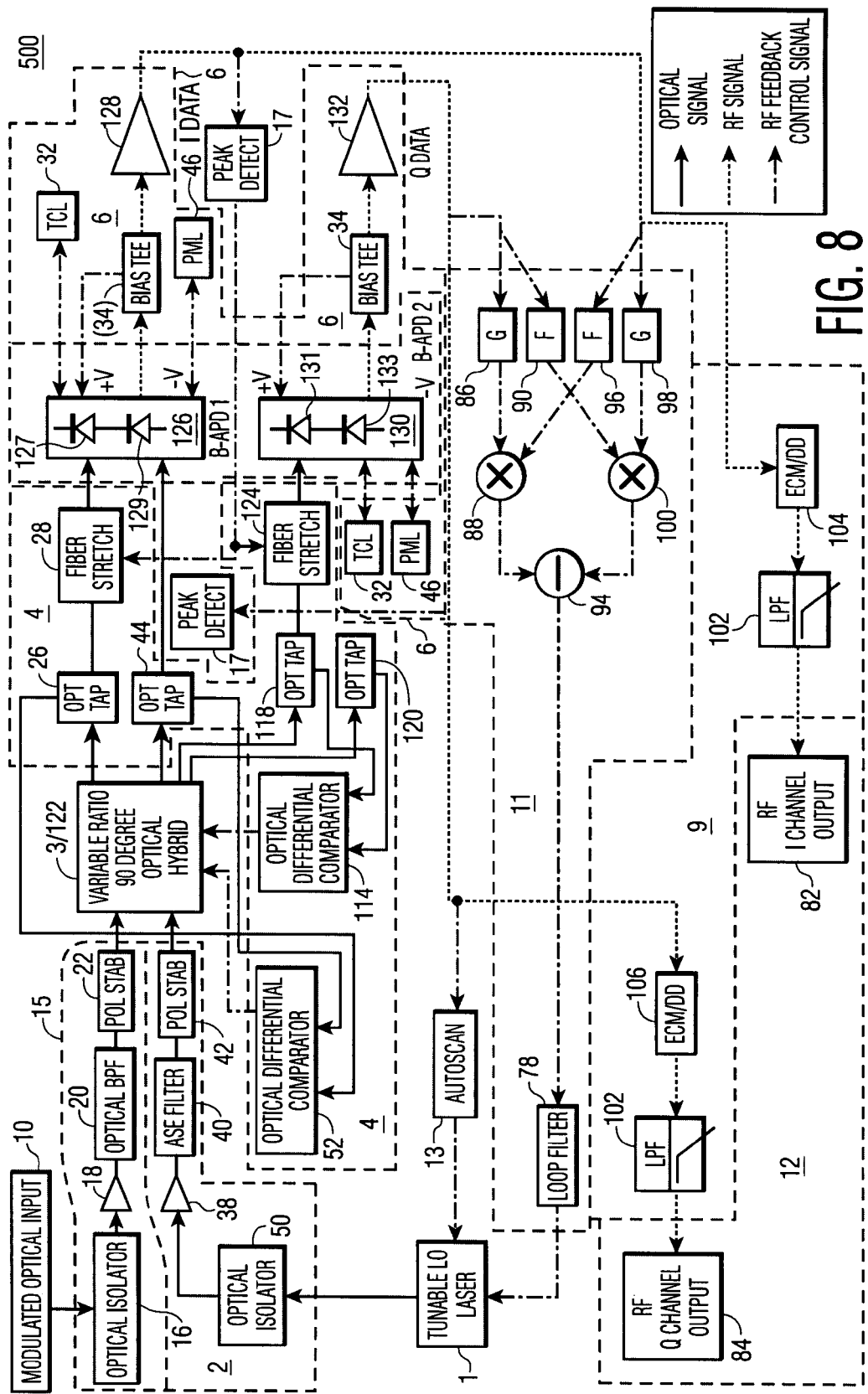
FIG. 8 is a block schematic diagram of a preferred embodiment of the invention for a homodyne surveillance coherent receiver including a B-APD.
Figure 10:
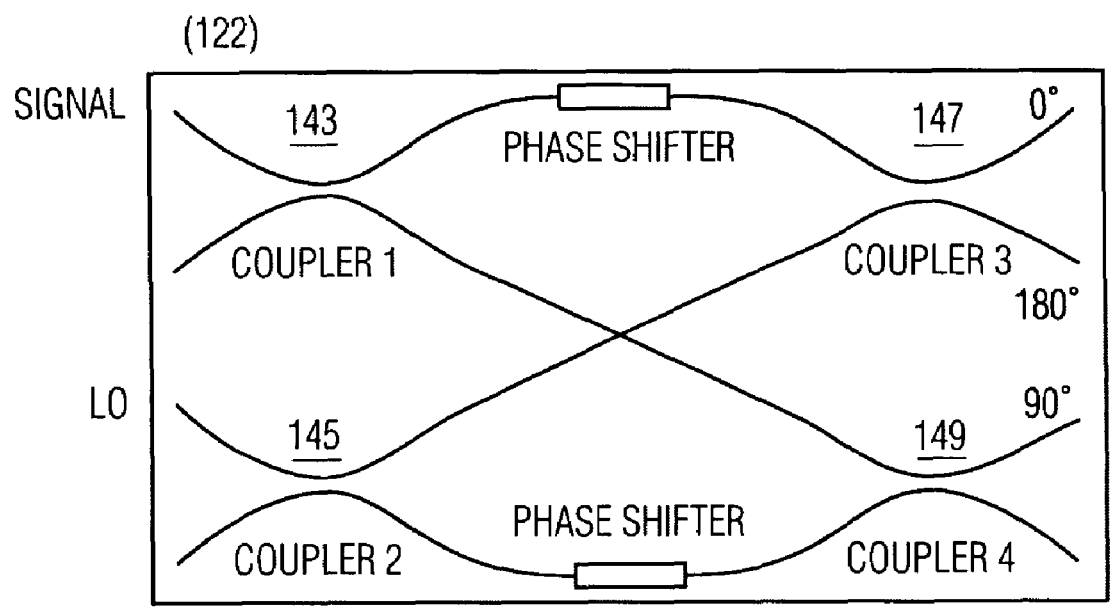
FIG. 10 a pictorial view of another embodiment of the invention for a variable ratio 90° optical hybrid used in the homodyne receiver embodiments of FIGS. 8 and 9.

With reference to FIG. 8, the modules of receiver 200 are configured to provide a homodyne surveillance coherent receiver 500, for another embodiment of the invention are shown. In contrast to the heterodyne surveillance coherent receivers 300, 400, respectively, a variable-ratio 90 degree optical hybrid 3/122 is used instead of a variable ratio coupler 3/24. A detailed view of the generic variable ratio 90 degree optical hybrid used in the homodyne version of the invention is shown in FIG. 10. The hybrid 3/122 generates in-phase (I) and quadrature-phase (Q) optical data. The Q data is needed as the input for phase-locking the LO laser 1 in this homodyne receiver 500. Since the I and Q data streams are generated via the optical hybrid 3/122, there is no need to generate these states in the RF domain, as is done in the heterodyne receivers 300 and 400 of FIGS. 6 and 7, respectively. The polarization states of the modulated optical input signal 10 and LO lasers 1 may need to be set at fixed polarization states, e.g., circular/linear. Also, in the homodyne platform 500, the RF output from the B-APD 126 is in the baseband, and no synchronous demodulation is needed. A portion of the RF output is split and fed into the autoscan module 13. The output from the autoscan module 13 controls the LO laser 1 temperature. Homodyne operation is maintained in this way.

With further reference to FIG. 8, the input optical signal 10 to the generic homodyne surveillance coherent receiver 500 is first input to an optical isolator 16, and then optionally fed through a low-noise optical amplifier 18, and then through an optical bandpass filter 20 with data-appropriate bandwidth. The filtered signal is then fed into a polarization stabilizer 22. This stabilizer 22 operates with a single-mode fiber input, and can be adapted to accept low-level optical signals. The output signal from the polarization stabilizer 22 is a polarization-maintaining (PM) fiber, and the polarization state can be maintained in the appropriate state of polarization (SOP). The output signal is inputted to the optical hybrid 3/122.

The LO laser 1, which is a PM fiber-pigtailed device with a fixed state of polarization, is connected into a PM two-stage optical isolator 50. The laser is chosen for lowest RIN and linewidth, while still being amenable to feedback drive circuitry. The output signal from this isolator 50 is on PM fiber, and is optionally fed into a low-noise optical amplifier 38 driving an optical amplified spontaneous emission (ASE) filter 40. This filtered output signal is then fed into a polarization stabilizer 42 with a chosen output SOP. For homodyne applications, the polarization states of the signal and LO laser 1 may need to be set at fixed polarization states, e.g., circular/linear.

Fiber outputs from the signal and optional LO polarization stabilizers 22, 42, respectively, are connected to a variable ratio 90° optical hybrid (VROH) 3/122. With reference to the optical hybrid of FIG. 10, the coupling ratios of internal Coupler 1 (143) and Coupler 2 (145) of the hybrid 3/122 are feedback-controlled to maintain the highest system performance. The coupling ratios of internal Coupler 3 (147) and Coupler 4 (149) are also voltage controlled. However, Couplers 147 and 149 are normally maintained at a 50/50 coupling ratio. There are four optical outputs from the VROH (variable ratio optical hybrid) 3/122. Two optical outputs from Coupler 3 (147) of the VROH 3/122 are both fed into 99:1 optical tap couplers (OT) 26 and 44 (see FIG. 8). About 99% of the input power to each optical tap (OT) 26, 44 is fed through to the I-channel balanced APD 126, which consists of a positive biased APD 127 and a negative biased APD 129. About 1% of the input to the optical tap couplers 26, 44 is fed into optical differential comparator 52 which drives the coupler 3 (147) of the voltage-controlled VROH 3/122. The output from the optical comparator 52 alternately transmits optical information from both taps 26, 44 at a predetermined commutation frequency to drive Coupler 3 (147) of the VROH 3/122. When Coupler 3 (147) of the VROH 3/122 is set at an effective 50/50 setting, a null voltage drives the Coupler 3 (147) of the VROH 3/122. This loop provides real-time voltage-controlled coupling stability to Coupler 3 (147) of the VROH 3/122 with negligible insertion loss of <0.05 dB.

There are two output fibers from Coupler 3 (147) of the VROH 3/122. One of the fibers is connected into a low loss (<0.5 dB) piezoelectric controlled fiber stretcher (FS) 28 via OT 26. The stretcher 28 has an analog input feedback port driven via peak detector 17 from the amplified output of the RF amplifier chain 128 in close proximity to the stretcher 28, and the feedback loop is designed to maintain the highest system performance. This is the active optical delay control loop. The output fibers from the fiber stretcher 28 and from the other OT 44 output fiber are directly pigtailed into the balanced APD 126, consisting of APD diode pairs 127 and 129. With these procedures equal optical path lengths between the VROH 3/122 and balanced APD 126 are maintained for optimal receiver 500 performance.

The balanced O/E elements 127 and 129 are avalanche photodiode pairs (APD's), which as previously indicated have sufficient RF bandwidth, nominally 70 percent of the data transmission rate, to efficiently process the homodyne optical signal 10. These APD's 127, 129 are designed to operate over a wide range of optical input powers, and can operate under linear conditions for large average optical inputs. The APD devices 127, 129 are grown to achieve a low excess noise figure of <2 dB. The B-APD pair 126 is built up in a microwave package to produce matched RF responses across the required bandwidth range of the RF signal. At high input optical powers, the APD's 127, 129 can achieve a multiplication factor of M=1.5. The exact value of M depends upon the reverse bias applied to the APD 126 and temperature. The APD's 127, 129 are assembled on a thermoelectric cooler (TEC) (not shown) along with a thermistor (not shown) inside the RF package of B-APD 126. These elements along with additional circuitry are designed in a control loop to maintain high precision temperature stability of the APD devices in the package. This is the temperature control loop (TCL) 32.

Note that either APD 126 or APD 129 has a bias voltage preset for optimal operation via a photocurrent monitor loop (PML) 46, which is the active APD gain set control loop.

The output voltage of the I-channel APD pair 126 is connected to the DC port of a wideband bias tee (BT) 34. Feedback circuitry driven by the output of BT 34 is designed to control the bias of the second APD 127, in order to achieve matched AC responsivity throughout the frequency range of the RF signal. This voltage is integrated over MANY bit pattern cycles and applied to the 'Slave' APD 127 to constantly adjust for near perfect balance. With this APD package 126 of APD's 127, 129 and the associated feedback circuitry, precise balancing between the balanced channels is achieved. This is the APD balance control loop. When the feedback voltage drive through the bias tee 34 is nulled, the DC responsivities of the APD's 127 and 129 are matched, and laser LO 1 RIN is minimized for optimal receiver 500 performance.

The RF output of the balanced APD pair 127 129 is fed into a well-isolated 50-ohm impedance low noise amplifier chain 128. This chain 128 supplies uniform gain with low group delay over the RF received passband. This chain 128 provides sufficient non-compressed RF power to appropriately drive the subsequent RF components. Also, the chain has sufficient RF bandwidth for the baseband homodyne signal (>0.7*(bit rate)).

The amplified RF I-signal is split into four paths. One path from amplifier chain 128 is input to peak detector 17. A second output of amplifier chain 128 is fed into an electronic compensation module with optional differential decoder (ECM/DD) 104. The other two portions of RF amplifier 128 are available for error signal processing. These signals are sent through digitally-based RF decision blocks F (96) and G (98). The output of F (96) is input to multiplier 88. The output of G (98) is fed into multiplier 100.

Two optical outputs from Coupler 4, (149) of the VROH 3/122 are both fed into 99:1 optical tap couplers (OT) 118 and 120, respectively. About 99% of the input power to each OT 118, 120 is fed through to the Q-channel of balanced APD 130, which consists of a positive biased APD 131 and a negative biased APD 133. About 1% of the input to the tap couplers 26, 44 is fed into optical differential comparator 114 which drives the coupler 4 (149) of the voltage-controlled VROH 3/122. The output from the optical comparator 114 alternately transmits optical information from both taps 118 and 120 at a predetermined commutation frequency to drive Coupler 4 (149) of the VROH 3/122. When Coupler 4 (149) of the VROH 3/122 is set at an effective 50/50 setting, a null voltage drives the Coupler 4 (149) of the VROH 3/122. This loop provides real-time voltage-controlled coupling stability to Coupler 4 (149) of the VROH 3/122 with negligible insertion loss of <0.05 dB.

There are two output fibers from Coupler 4 (149) of the VROH 3/122. One of the fibers is connected into a low loss (<0.5 dB) piezoelectric controlled fiber stretcher (FS) 124. The FS 124 has an analog input feedback port driven from the amplified output of the RF amplifier chain 132 in close proximity to the FS 124, and the feedback loop is designed to maintain the highest system performance. This is the active optical delay control loop. A standard peak detect circuit 17 drives the stretcher or FS 124. The output fibers from the fiber stretcher 124 and from the Coupler 4 (149) output fiber are directly pigtailed into the balanced APD 130, consisting of APD pairs 131 and 133. With these procedures equal optical path lengths between the VROH 3/122 and balanced APD 130 are maintained for optimal receiver 500 performance.

The balanced O/E elements 131 and 133 are avalanche photodiodes (APD's) having sufficient RF bandwidth, nominally 70 percent of the data transmission rate, to efficiently process the homodyne optical signal 10. These APD's 131, 133 are designed to operate over a wide range of optical input powers, and can operate under linear conditions for large average optical inputs. The APD devices 131,133 are grown to achieve a low excess noise figure of <2 dB. The APD pair 130 is built up in a microwave package to produce matched RF responses across the required bandwidth range of the RF signal. At high input optical powers, the APD's 131, 133 can achieve a multiplication factor of M=1.5. The exact value of M depends upon the reverse bias applied thereto and temperature. The APD's 131, 133 are assembled on a thermoelectric cooler (TEC) (not shown) along with a thermistor (not shown) inside the APD RF package 130. These elements along with additional circuitry are designed in a control loop to maintain high precision temperature stability of the APD devices 131, 133 in the package 139. This is the temperature control loop (TCL) 32.

Note that APD 133 voltage has a bias voltage preset for optimal operation via a photocurrent monitor loop (PML) 46. This is the active APD gain set control loop.

The output voltage of the Q-channel APD RF package 130 is connected through the DC port of a wideband bias tee (BT) 34. Feedback circuitry driven by the output of BT 34 is designed to control the bias of the second APD 131, in order to achieve matched AC responsivity throughout the frequency range of the RF signal. This voltage is integrated over MANY bit pattern cycles and applied to the 'Slave' APD 131 to constantly adjust for near perfect balance. With this APD RF Package 130 and the associated feedback circuitry, precise balancing between the balanced channels is achieved. This is the APD balance control loop. When the feedback voltage drive through the bias tee or BT 34 is nulled, then the DC responsivities of the APD's 131 and 133 are matched, and laser 1 RIN is minimized for optimal receiver 500 performance.

The RF output of the balanced APD pairs 131, 133 is fed into a well-isolated 50-ohm impedance low noise amplifier chain 132. This amplifier chain 132 supplies uniform gain with low group delay over the RF received passband. This amplifier chain 132 provides sufficient non-compressed RF power to appropriately drive the subsequent RF components. Also, the chain has sufficient RF bandwidth for the baseband homodyne signal (>0.7*(bit rate)).

The amplified RF Q-signal is split into five paths, from amplifier chain 132. One path of amplifier chain 132 is input to a Q channel peak detect block 17. A second output of amplifier chain 132 is fed into an electronic compensation module with optional differential decoder (ECM/DD) 106, which is fed to a low-pass filter 102, which is followed by the RF Q channel output 84. Two other portions of amplifier chain 132 are available for error signal processing. These signals are sent through digitally-based RF decision blocks F (90) and G (86). The output of F (90) is input to multiplier 100. The output of G (86) is fed into multiplier 88. The fifth output from amplifier chain 132 is fed to the autoscan module 13 which drives the tunable LO laser 1.

The RF outputs of multipliers 88 and 100 are fed into an RF subtraction module 94. The output of module 94 is an error signal that drives the loop filter 78. The output of filter 78 drives the tunable LO laser 1 and insures strict frequency and phase locking of LO 1 is maintained.

The autoscan circuit 13 automatically scans the LO laser 1 via temperature control so that a frequency lock between the LO laser 1 and signal transmission is maintained at homodyne. The LO laser 1 is coarsely tuned in wavelength by changing the temperature. A change from a lower temperature to a higher temperature increases the wavelength of the LO laser 1.

The autoscan 13 utilizes a Digital-to-Analog Converter (DAC) (not shown), for scanning the temperature from a low temperature to a higher temperature by the use of digital counters with a clock set at an appropriate rate for a controlled scan or 'tuning' of the laser 1. Referring to FIG. 5, the 'beat' of the unknown signal can be searched for by starting a scan at the low temperature range and proceeding to the high temperature range. The scan will eventually pass a signal associated with the homodyne condition between the LO laser 1 and the unknown signal. When this signal is detected additional circuitry will stop the digital counters, enable the PLL phase comparator and lock onto this unknown signal. Additional comparator circuitry is available to monitor the output of the PLL loop filter 78. When the positive or negative extremes are approached indicating a potential loss of lock (going out, of the lock range) this circuitry will adjust the temperature appropriately to place the loop filter 78 back near the center of its locking range. With this monitoring system once the loop is locked the unknown signal can be tracked if it is drifting over most of the temperature control range thereby expanding drastically the locking range of the system.

The prior art would have to use an Optical Spectrum Analyzer (OSA) to find the LO laser 1 wavelength and the unknown signal wavelength. Then the temperature of the LO laser 1 would need to be changed until the two wavelengths were very similar. Because the OSA does not have sufficient wavelength resolution, an RF spectrum analyzer must now be used after O/E conversion to further fine tune the temperature to get very close to homodyne operation. Both of these instruments are large, heavy, and costly. Various wavelength division multiplex (WDM) transmission channels can be studied and analyzed using this feature.

Note that the RF component characteristics in the coherent receiver 500 of the invention are appropriately chosen to process the optical homodyne signal 10 in the optimal fashion.

Figure 9:
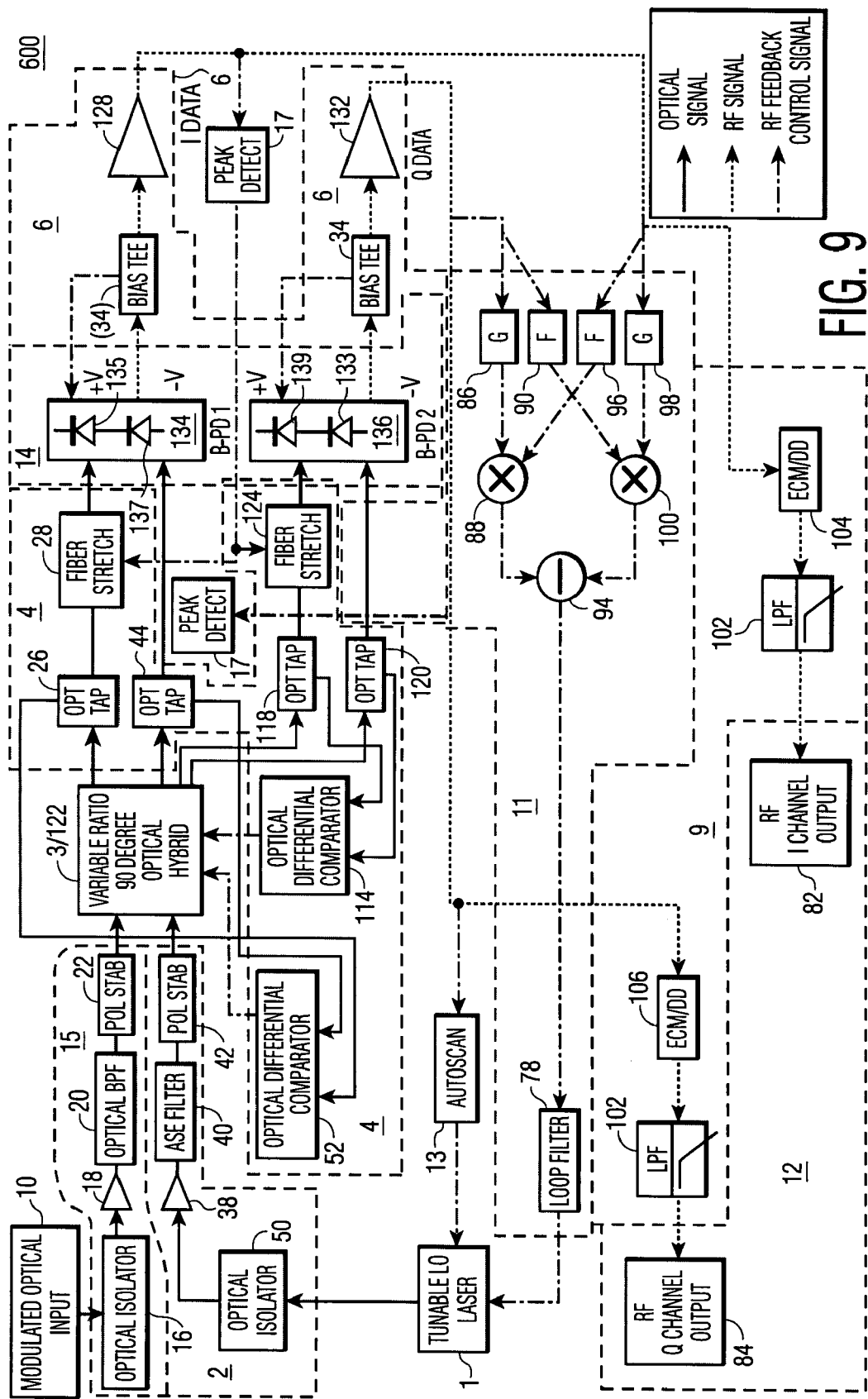
FIG. 9 is a block schematic diagram of another embodiment of the invention for a homodyne surveillance coherent receiver including a B-PD.

With reference to FIG. 9, the modules of receiver 200 of FIG. 2 are configured to provide a homodyne surveillance receiver 600 with balanced photodiodes 135 and 137 in RF package 134 and balanced photodiodes 139 and 141 in RF package 136. This receiver 600 can provide high bit rate digital homodyne transmissions. For example, the PIN-based DSC740 has 35 GHz bandwidth, and would be the balanced photodiode of choice for packages 134 and 136, providing for 40 Gb/s homodyne processing, which requires 28 GHz of RF bandwidth. The DC responsivity of a balanced photodiode pair is approximately 0.7 A/W, while that of an APD pair can be approximately 1.5 A/W. The lower DC responsivity through use of balanced PIN diodes for packages 134 and 136 will lead to degraded sensitivity performance of the secondary embodiment of the invention shown in FIG. 9. Also, no feedback loops are applied to the B-PD packages 134 and 136, so the receiver performance may be slightly degraded versus the preferred embodiment of the invention shown in FIG. 8. This is explained by the fact that the feedback loop applied to the balanced APD serves the purpose of equalizing the DC responsivities of the two APD's 127 and 129 of package 126, and 131 and 133 of package 130. Therefore, the result will be to more completely cancel the RIN of the LO laser 1, which improves sensitivity performance of the preferred embodiment of the receiver 500, over the performance of the B-PD based secondary embodiment for receiver 600.

In reference to FIG. 7, a number of the components have been implemented in a prototype coherent 10 Gb/s ASK modulation heterodyne receiver, operating at an IF of 27 GHz as listed below in Table 1:

TABLE 1

| Component | Manufacturer | Part Number | Operating Parameters |
|---|---|---|---|
| 22 | General Photonics | POS-103-OEM | Input Power: −40 to +10 dBm |
| 3/24 | Canadian Instrumentation | 954P | 50/50 fixed ratio |
| 14/30 | Discovery Semiconductors | DSC740 | 35 GHz Bandwidth |
| 36 | Spacek | SLKKa-30-6 | 18-40 GHz Bandwidth, 35 dB RF gain, 3.5 dB noise figure |
| 62, 66 | Marki Microwave | M9-0750 | 7-50 GHz RF/LO; DC-10 GHz IF |
| 74, 76 | Picosecond Pulselabs | 5915-110-10.00 | DC-10 GHz Bandwidth |
| 1 | JDSU | CQF 935-908 | 63 mW, −160 dB/Hz RIN, <2 MHz linewidth |
| 50, 16 | General Photonics | ISO-D-15-PP | 40 dB isolation |
| 64 | Spectrum-ET | LS-0140-KFKM | 18-40 GHz; 25 ps delay |
| 68 | Discovery Semiconductors | | |
| 13 | Discovery Semiconductors | | 2 nm tuning range; 60 MHz frequency resolution |

The remaining components in FIG. 7 have been conceptually described above, but have not yet been realized.

Although various embodiments of the present invention are shown and described, they are not meant to be limiting. Those of skill in the art may recognize certain modifications to these embodiments, which modifications are meant to be covered by the spirit and scope of the appended claims.

What is claimed is:

1. An optical coherent receiver comprising:
   a series connected subsystem successively including an input signal processor driving an optical coupler, the latter driving a post coupler optical processor, the latter driving a balanced optical-to-electrical (OE) converter, the latter driving an RF processor, the latter driving a baseband RF/EDC (Electronic Dispersion Compensation/Equalization) processor, the latter providing an RF output signal from said receiver;

a first closed loop subsystem including a peak detector connected between said RF processor and said post coupler optical processor;

a second closed loop subsystem including a frequency and phase lock network (FPL) driven by said RF processor, an optical local oscillator (LO) driven by the said FPL, and an optical LO processor driven by said optical LO, said optical LO processor driving said optical coupler;

a third closed loop subsystem including said RF processor driving an autoscan, the latter driving said optical LO;

said input signal processor being operative for receiving and processing a modulated optical input signal to provide a stable polarized optical output signal $E_{sig}$;

said optical coupler being independently receptive of $E_{sig}$, and an optical reference signal $E_{LO}$, for providing a plurality of output signals each of which are a combination of $E_{sig}$ and $E_{LO}$, and each of which are phase shifted from one another;

said post coupler optical processor being independently receptive of said plurality of output signals from said optical coupler, respectively, for both processing these signals via included fiber stretching means for equalizing the path lengths thereof and providing the same as a plurality of path length equalized optical output signals, and for providing an optically derived RF feedback signal to said optical coupler for causing the ratios between any two of the plurality of output signals therefrom to be of a given value;

said balanced optical-to-electrical (OE) converter being receptive of said plurality of path length equalized optical output signals, for converting these signals into at least one RF output signal;

said RF processor being receptive of said at least one RF output signal for providing a first RF feedback signal that is peak detected via said peak detector to drive said fiber stretching means of said post coupler optical processor to maintain the equalization of said plurality of path length equalized optical signals, for further providing a second RF feedback signal to said autoscan for driving the latter to produce an output signal therefrom for temperature correcting said optical LO, for further providing a third RF feedback signal to drive said frequency and phase lock module to control the phase and frequency of said optical LO, whereby the phase of the latter is locked to the phase of said optical input signal, and for providing a baseband output signal;

said baseband RF/EDC processor being receptive of said baseband output signal for processing the same to compensate for both noise and transmission impairments of this signal, and for producing the RF output signal of said receiver;

said peak detector being receptive of an RF signal from said RF processor, for providing a control output signal representative of the peak of the RF output signal, for controlling said post coupler optical processor to insure optimal coupling ratio;

said FPL being receptive of an RF error signal from said RF processor, for providing a drive output signal for controlling said optical LO to align its frequency/phase to the modulated input signal;

said optical LO being operative to produce an optical output signal for driving said optical LO processor to produce said $E_{LO}$ reference signal; and said autoscan being receptive of a filtered IF signal from said RF processor for detecting, tracking, and locking onto said optical input signal.

2. The optical coherent receiver of claim 1, wherein said first balanced OE converter consists of at least one pair of avalanche photodiodes.

3. The optical coherent receiver of claim 1, wherein said input signal processor includes means for optically isolating $E_{sig}$.

4. The optical coherent receiver of claim 1, wherein said input signal processor includes means for amplifying and filtering $E_{sig}$.

5. The optical coherent receiver of claim 3, wherein said input signal processor further includes means for amplifying and filtering $E_{sig}$.

6. The optical coherent receiver of claim 1, wherein said input signal processor is operative for optically isolating, amplifying, filtering, and polarizing said input signal to provide $E_{sig}$.

7. The optical coherent receiver of claim 2, wherein said RF processor is further operative to provide a fourth RF feedback signal to drive said balanced OE converter to control the responsivity of said balanced OE converter.

8. The optical coherent receiver of claim 1, wherein said RF processor includes means for configuring said receiver as a superheterodyne receiver.

9. The optical coherent receiver of claim 1, wherein said RF processor includes means for configuring said receiver as a homodyne receiver.

10. The optical coherent receiver of claim 8, wherein said optical coupler consists of a variable ratio optical coupler.

11. The optical coherent receiver of claim 9, wherein said optical coupler consists of a variable ratio 90° optical hybrid.

12. The optical coherent receiver of claim 8, wherein said post coupler optical processor includes:

a first optical tap receptive of a first output signal from said variable ratio optical coupler, for splitting the signal into a 99% first feed forward signal, and a first 1% feedback signal;

a second optical tap receptive of a second output signal from said variable ratio optical coupler, for splitting the signal into a 99% second feed forward signal, and a second 1% feedback signal;

a fiber stretcher receptive of said first feed forward signal, for processing this signal to provide optical path equalizer between said first and second feed forward signals, and producing a fiber stretched feed forward signal;

an optical differential comparator receptive of said first and second 1% feedback signals, for producing an electrical direct current (DC) output signal having a voltage level representative of the difference in amplitude between said feedback signals; and said variable ratio optical coupler being receptive of said DC output signal from said differential comparator to insure a 50/50 coupling ratio for the first and second output signals of the coupler.

13. The optical coherent receiver of claim 1, wherein said balanced OE converter includes a pair of positively and negatively biased avalanche photodiodes, respectively, individually receptive of said path length equalized optical output signals, respectively, for producing said at least one RF output signal.

14. The optical coherent receiver of claim 12, wherein said balanced OE converter includes positively and negatively biased first and second avalanche photodiodes (APD), respectively, for receiving said fiber stretched feed forward signal, and said 99% second feed forward signal, for producing said at least one RF output signal.

15. The optical coherent receiver of claim 13, wherein said RF processor includes:

a broadband bias tee receptive of said one RF output signal, for both producing a DC feedback signal to said first APD to provide AC responsivity balancing between said first and second APD's, and for providing a feed forward RF output signal analogous to said at least one RF output signal;

an impedance-matched broadband RF amplifier receptive of said feed forward RF output signal from said bias tee, for providing an amplified RF output signal to said peak detector;

a bandpass filter receptive of said amplified RF output signal, for producing an intermediate frequency (IF) beat note signal;

an IF detect module receptive of said IF beat note signal for producing an IF RF output signal;

a first double balanced mixer receptive individually of both said amplified RF output signal, and said IF beat note signal, for mixing these signals together to produce a first mixer output signal;

a first low-pass filter (LPF) receptive of said first mixer output signal, for producing a first LPF output signal;

a 90% delay module receptive of said IF beat note signal, for outputting a delayed beat note signal;

a second double balanced mixer receptive individually of both said amplified RF output signal, and said delayed beat note signal for producing a second mixer output signal;

a second low-pass filter (LPF) receptive of said second mixer output signal, for producing a second LPF output signal;

a first sample-and-hold RF module receptive of said first LPF output signal, operable for time delaying this signal, to produce on demand a first sampled RF output signal;

a first decision block receptive of said first LPF output signal, operable for digitizing this signal to provide a first decision block output signal;

a second decision block receptive of said second LPF output signal, operable for digitizing this signal to provide a second decision block output signal;

a second sample-and hold RF module receptive of said second LPF output signal, operable for time delaying this signal to produce on demand a second sampled RF output signal;

a first multiplier receptive of both said first sampled RF output signal, and said second decision block output signal, for multiplying the two signals to produce a first multiplier output signal;

a second multiplier receptive of both said second sampled RF output signal, and said first decision block output signal, for multiplying the two signals to produce a second multiplier output signal;

a subtraction module receptive of said first and second multiplier output signals, for producing said RF error signal representative of the difference between these signals; and said first and second LPF output signals in combination being representative of said baseband output signal.

16. The optical coherent receiver of claim 1, wherein said balanced OE converter includes a positively and a negatively biased first and second photodiodes, respectively, individually receptive of said path length equalized optical output signals, respectively, for producing said at least one RF output signal.

17. The optical coherent receiver of claim 15, further including:

a photocurrent monitor loop for driving the voltage of the negatively biased second APD for optimal operation; and a temperature control loop for maintaining high precision temperature stability of said first and second APD's.

18. The optical coherent receiver of claim 16, wherein said RF processor includes:

a broadband bias tee receptive of said one RF output signal, for both producing a DC feedback signal to said first photodiode to provide AC responsivity balancing between said first and second photodiodes, and for providing a feed forward RF output signal analogous to said at least one RF output signal;

an impedance-matched broadband RF amplifier receptive of said feed forward RF output signal from said bias tee, for providing an amplified RF output signal to said peak detector;

a bandpass filter receptive of said amplified RF output signal, for producing an intermediate frequency (IF) beat note signal;

an IF detect module receptive of said IF beat note signal for producing an IF RF output signal;

a first double balanced mixer receptive individually of both said amplified RF output signal, and said IF beat note signal, for mixing these signals together to produce a first mixer output signal;

a first low-pass filter (LPF) receptive of said first mixer output signal, for producing a first LPF output signal;

a 90% delay module receptive of said IF beat note signal, for outputting a delayed beat note signal;

a second double balanced mixer receptive individually of both said amplified RF output signal, and said delayed beat note signal for producing a second mixer output signal;

a second low-pass filter (LPF) receptive of said second mixer output signal, for producing a second LPF output signal;

a first sample-and-hold RF module receptive of said first LPF output signal, operable for time delaying this signal, to produce on demand a first sampled RF output signal;

a first decision block receptive of said first LPF output signal, operable for digitizing this signal to provide a first decision block output signal;

a second decision block receptive of said second LPF output signal, operable for digitizing this signal to provide a second decision block output signal;

a second sample-and hold RF module receptive of said second LPF output signal, operable for time delaying this signal to produce on demand a second sampled RF output signal;

a first multiplier receptive of both said first sampled RF output signal, and said second decision block output signal, for multiplying the two signals to produce a first multiplier output signal;

a second multiplier receptive of both said second sampled RF output signal, and said first decision block output signal, for multiplying the two signals to produce a second multiplier output signal;

a subtraction module receptive of said first and second multiplier output signals, for producing said RF error signal representative of the difference between these signals; and said first and second LPF output signals in combination being representative of said baseband output signal.

19. The optical coherent receiver of claim 11, wherein said post coupler optical processor includes:

first through fourth optical taps receptive of first through fourth optical output signals from said optical coupler, respectively, for both producing first through fourth output signals, respectively, each of which are 99% the level of their associated received signal, and for producing first through fourth feedback signals, respectively, each of which are 1% the level of their associated received signal;

a peak detector receptive of said second 99% output signal, and a feedback signal from said RF processor;

first and second fiber stretchers receptive of said first and third 99% output signals, said second fiber stretcher being further receptive of an output signal from said peak detector, said first and second fiber stretchers being operative to equalize the optical path lengths of said first and second 99% output signals, and said third and fourth 99% output signals, respectively;

a first optical differential comparator receptive of said first and second 1% feedback signals, respectively, for producing an output signal that is fed back to said optical coupler; and a second optical differential comparator receptive of said third and fourth 1% feedback signals, respectively, for producing an output signal that is fed back to said optical coupler;

said first fiber stretcher, second optical tap, second fiber stretcher, and fourth optical tap, providing first through fourth output signals from said post coupler optical processor.

20. The optical coherent receiver of claim 19, wherein said balanced OE converter includes:

a first pair of photodiodes, each of which are positively and negatively biased, respectively, receptive of said first and second output signals from said post coupler optical processor, for converting these signals from optical into a first RF (radio frequency) output signal; and a second pair of photodiodes, each of which are positively and negatively biased, respectively, receptive of said third and fourth output signals from said post coupler optical processor, for converting these signals from optical into a second RF output signal.

21. The optical coherent receiver of claim 20, wherein said RF processor includes:

first and second bias tees individually receptive of said first and second RF output signals, respectively, from said balanced OE converter, for both providing bias voltages back to said first and second pair of photodiodes, respectively, and passing through said first and second RF output signals;

first and second amplifiers receptive of said first and second RF output signals from said first and second bias tees, respectively, for providing third and fourth RF output signals;

first and second peak detectors receptive of said third and fourth RF output signals for providing feedback signals to said first and second fiber stretchers, respectively;

first and second time delay modules receptive of said third and fourth RF output signals, for producing fifth and sixth RF output signals representing time delayed third and fourth RF output signals, respectively;

first and second analog-to-digital (A/D) converters receptive of said third and fourth RF output signals, respectively, for converting these signals into first and second digitized RF output signals, respectively;

a first multiplier receptive of said fifth RF output signal, and said second digitized RF output signal, for producing a seventh RF output signal that is the product of the previous two signals;

a second multiplier receptive of and for multiplying together said sixth RF output signal and first digitized RF output signal, to produce an eighth RF output signal;

an RF subtraction module receptive of said seventh and eighth RF output signals, for producing said error signal to drive said FPL; and said third and fourth RF output signals also being provided for driving said baseband RF/EDC processor, and said autoscan, respectively.

22. The optical coherent receiver of claim 21, wherein said baseband RF/EDC processor includes:

a first differential decoder receptive of said third RF output signal, for producing a first decoded signal;

a first low-pass filter receptive of said first decoded signal, for producing an RF I channel output signal;

a second differential decoder receptive of said fourth RF output signal, for producing a second decoded signal; and a second low-pass filter receptive of said second decoded signal, for producing an RF Q channel output signal.

23. The optical coherent receiver of claim 21, wherein said first and second pairs of photodiodes each consists of positively and negatively biased avalanche photodiodes, respectively.

24. The optical coherent receiver of claim 23, further including:

a temperature control loop for maintaining high precision temperature stability of said first and second APD's; and a photocurrent monitor loop for driving the voltage of the negatively biased second APD for optimal operation.

25. The optical coherent receiver of claim 15, wherein said baseband RF/EDC processor includes:

a first differential decoder receptive of said first LPF output signal, for producing a first decoded signal, providing an RF I channel output signal; and a second differential decoder receptive of said second LPF output signal for producing a second decoded signal, providing an RF Q channel output signal.

26. The optical coherent receiver of claim 18, wherein said baseband RF/EDC processor includes:

a first differential decoder receptive of said first LPF output signal, for producing a first decoded signal, providing an RF I channel output signal; and a second differential decoder receptive of said second LPF output signal for producing a second decoded signal, providing an RF Q channel output signal.

27. The optical coherent receiver of claim 15, further including:

said FPL being receptive of said error signal;

said optical LO consisting of a tuneable local oscillator (LO) laser receptive of output signals from both said FPL and said autoscan, for locking the frequency and phase of an optical output signal from said TLO to that of a modulated optical input signal inputted to said input signal processor;

said optical LO processor including:

an optical isolator receptive of the optical output signal from said TLO, for providing an optically isolated output signal;

an amplifier receptive of said optically isolated output signal;

an ASE filter receptive of an optical output signal from said amplifier; and a polarization stabilizer receptive of an output signal from said ASE filter, for providing a polarization stabilized optical output signal to drive said optical coupler.

28. The optical coherent receiver of claim 18, further including:

said FPL being receptive of said error signal;

said optical LO consisting of a tuneable local oscillator (LO) laser receptive of output signals from both said FPL and said autoscan, for locking the frequency and phase of an optical output signal from said TLO to that of a modulated optical input signal inputted to said input signal processor;

said optical LO processor including:

an optical isolator receptive of the optical output signal from said TLO, for providing an optically isolated output signal;

an amplifier receptive of said optically isolated output signal;

an ASE filter receptive of an optical output signal from said amplifier; and a polarization stabilizer receptive of an output signal from said ASE filter, for providing a polarization stabilized optical output signal to drive said optical coupler.

29. The optical coherent receiver of claim 1, wherein said input signal processor includes:

an optical isolator receptive of said modulated optical input signal, for providing an optically isolated modulated optical output signal;

an amplifier receptive of said optical output signal, for modifying this signal;

an optical bandpass filter (BPF) receptive of and for filtering out out-of-band optical noise from an output signal from said amplifier; and a polarization stabilizer receptive of a filtered output signal from said BPF, for providing said stable polarized optical output signal $E_{sig}$.

* * * * *